(12) United States Patent
Kawai et al.

(10) Patent No.: US 10,399,553 B2
(45) Date of Patent: Sep. 3, 2019

(54) OPERATING SWITCH AND PARKING BRAKE CONTROL DEVICE

(71) Applicant: HITACHI AUTOMOTIVE SYSTEMS, LTD., Ibaraki (JP)

(72) Inventors: Hiroaki Kawai, Kawasaki (JP); Kenichiro Matsubara, Kasumigaura (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 52 days.

(21) Appl. No.: 15/755,316

(22) PCT Filed: Aug. 26, 2016

(86) PCT No.: PCT/JP2016/074985
§ 371 (c)(1),
(2) Date: Feb. 26, 2018

(87) PCT Pub. No.: WO2017/038685
PCT Pub. Date: Mar. 9, 2017

(65) Prior Publication Data
US 2018/0244255 A1    Aug. 30, 2018

(30) Foreign Application Priority Data

Aug. 31, 2015   (JP) .................................. 2015-171300

(51) Int. Cl.
*B60T 17/22*     (2006.01)
*B60T 7/04*      (2006.01)
(Continued)

(52) U.S. Cl.
CPC ............ *B60T 17/223* (2013.01); *B60T 7/042* (2013.01); *B60T 7/085* (2013.01); *B60T 7/107* (2013.01);
(Continued)

(58) Field of Classification Search
CPC .. B60T 17/223; B60T 7/107; B60T 2270/416; B60T 13/746; B60T 8/885; B60Y 2306/15
See application file for complete search history.

(56) References Cited

U.S. PATENT DOCUMENTS

2010/0314225 A1*  12/2010  Grieser-Schmitz ..... B60T 7/107
                                                200/17 R
2012/0296516 A1*  11/2012  Febrer ..................... B60T 7/107
                                                701/34.4

FOREIGN PATENT DOCUMENTS

JP     2002-529314     9/2002
JP     2010-512277     4/2010
(Continued)

OTHER PUBLICATIONS

International Search Report dated Nov. 29, 2016 in International Application No. PCT/JP2016/074985.

*Primary Examiner* — Vishal R Sahni
(74) *Attorney, Agent, or Firm* — Wenderoth, Lind & Ponack, L.L.P.

(57) ABSTRACT

An operating switch for commanding actuation of an electric parking brake mechanism includes two input terminals and two output terminals, a pair of two wirings for each input-terminal/output-terminal pair of the two input terminals and the two output terminals, each of the wirings being located between the input terminals and the two output terminals, a first switch element provided for the input terminals or the output terminals, and configured to switch connections to the two wirings, according to a command for the actuation, and a second switch element connected to one wiring of the two wirings that connects the input terminals and the output terminals when the command for the actuation given to the first switch element is set to a mode of non-operation. The second switch element is configured to switch connections (Continued)

to the two output terminals or the two input terminals, according to the command for the actuation.

19 Claims, 13 Drawing Sheets

(51) Int. Cl.
*B60T 7/08* (2006.01)
*B60T 7/14* (2006.01)
*B60T 7/10* (2006.01)
*B60T 8/88* (2006.01)
*B60T 13/74* (2006.01)

(52) U.S. Cl.
CPC ............... *B60T 7/14* (2013.01); *B60T 8/885* (2013.01); *B60T 13/746* (2013.01); *B60T 17/22* (2013.01); *B60T 2270/416* (2013.01); *B60Y 2306/15* (2013.01)

(56) References Cited

FOREIGN PATENT DOCUMENTS

| | | | |
|---|---|---|---|
| JP | 2013-151884 | | 8/2013 |
| JP | 2014-104880 | | 6/2014 |
| WO | WO2015115019 | * | 8/2015 |

* cited by examiner

Fig. 8

| Voltage application patterns | Normal state | | P1 wire disconnection | | P2 wire disconnection | | P3 wire disconnection | | P4 wire disconnection | |
|---|---|---|---|---|---|---|---|---|---|---|
| | Detection 1 (D1) | Detection 2 (D2) | Detection 1 (D1) | Detection 2 (D2) | Detection 1 (D1) | Detection 2 (D2) | Detection 1 (D1) | Detection 2 (D2) | Detection 1 (D1) | Detection 2 (D2) |
| Non-operation | A×V1 | B×V2 | 0 | B×V2 | A×V1 | 0 | A×V1 | 0 | 0 | B×V2 |
| Apply operation | C×V2 | D×V1 | C×V2 | 0 | 0 | D×V1 | C×V2 | 0 | 0 | D×V1 |
| Release operation | A×V2 | B×V1 | A×V2 | 0 | 0 | B×V1 | A×V2 | 0 | 0 | B×V1 |

OPERATING SWITCH AND PARKING BRAKE CONTROL DEVICE

TECHNICAL FIELD

The present invention relates to an operating switch for electric parking brakes and a parking brake control device.

BACKGROUND ART

Electric parking brakes mounted on vehicles such as automobiles apply (activate) and release brake force (parking brakes), based on operation of the operating switch by the driver (Parent Literature 1). Patent Literature 1 discloses a technique for identifying any failure of an input device for operating electric parking brakes, with the aid of a control device.

CITATION LIST

Patent Literature

PTL 1: Domestic Announcement No. 2002-529314 of PCT Application

SUMMARY OF INVENTION

Technical Problem

The technology disclosed in Patent Literature 1 may require a large number of parts that leads to a cost increase.

An object of the present invention is to provide an operating switch and a parking brake control device that capable of commanding a required operation mode and detecting the operation mode and any failure with a simple structure.

Solution to Problem

An operating switch according to one embodiment of the present invention for commanding an actuation of an electric parking brake mechanism includes: two input terminals and two output terminals; two wirings for respective pairs of the input terminal and the output terminal each located between the input terminals and the output terminals; a first switch element provided for the input terminals or the output terminals, and configured to switch a connection to the two wirings in response to a command for the actuation; and second switch elements connected to one of the two wirings that is put into connection when the actuation command is non-operation in the first switch elements, and configured to switch connections to the two output terminals or the two input terminals according to a command for the actuation. At least either one wiring or the other wiring of the pair of two wirings is provided with resistances that differ in value from each other.

More specifically, the operating switch according to the one embodiment of the present invention is an operating switch for commanding a mode of non-operation, a mode of brake actuation, and a mode of brake release as actuations of an electric parking brake mechanism. The operating switch includes: two input terminals; two output terminals; four resistance wires provided between the two input terminals and the two output terminals and having respective resistance elements that differ in value from each other; a first switch element configured to simultaneously switch, to the two input terminals, two first resistance wires, of the four resistance wires, connected to the respective output terminals, and the other two second resistance wires, according to the mode command; and a second switch element configured to simultaneously switch, to the two first resistance wires, the two respective output terminals, according to the mode command. The two output terminals respectively output signals that differ from each other, according to the mode command.

A parking brake control device according to one embodiment of the present invention is a parking brake control device for detecting operation modes of non-operation, actuation command, and release command by applying voltage to an operating switch for commanding an actuation of an electric parking brake mechanism. The operating switch includes two output terminals configured to respectively output signals that differ from each other, according to the operation modes, using resistance elements disposed in the operating switch. The parking brake control device includes a detection unit configured to detect an operation mode and a switch failure, based on output values from the output terminals when voltage is applied to contacts of the operating switch. Based on a result detected by the detection unit, informing is performed by informing units that differ from each other. More specifically, a failure informing is performed upon detection of switch failure by the detection unit, and if an operation of the operating switch is detected by the detection unit while the failure informing is being performed, an informing unit, other than a failure informing unit, informs that the operation cannot be accepted.

Advantageous Effects of Invention

The operating switch and parking brake control device according to the embodiments of the present invention are capable of commanding a required operation mode and detecting the operation mode and any failure, with a simple structure.

BRIEF DESCRIPTION OF DRAWINGS

FIG. 8 is a list of the relationships between operation modes of the parting brake switch and voltages at the time of normal operation and at the time of wire disconnection.

DESCRIPTION OF EMBODIMENTS

Figure 6:
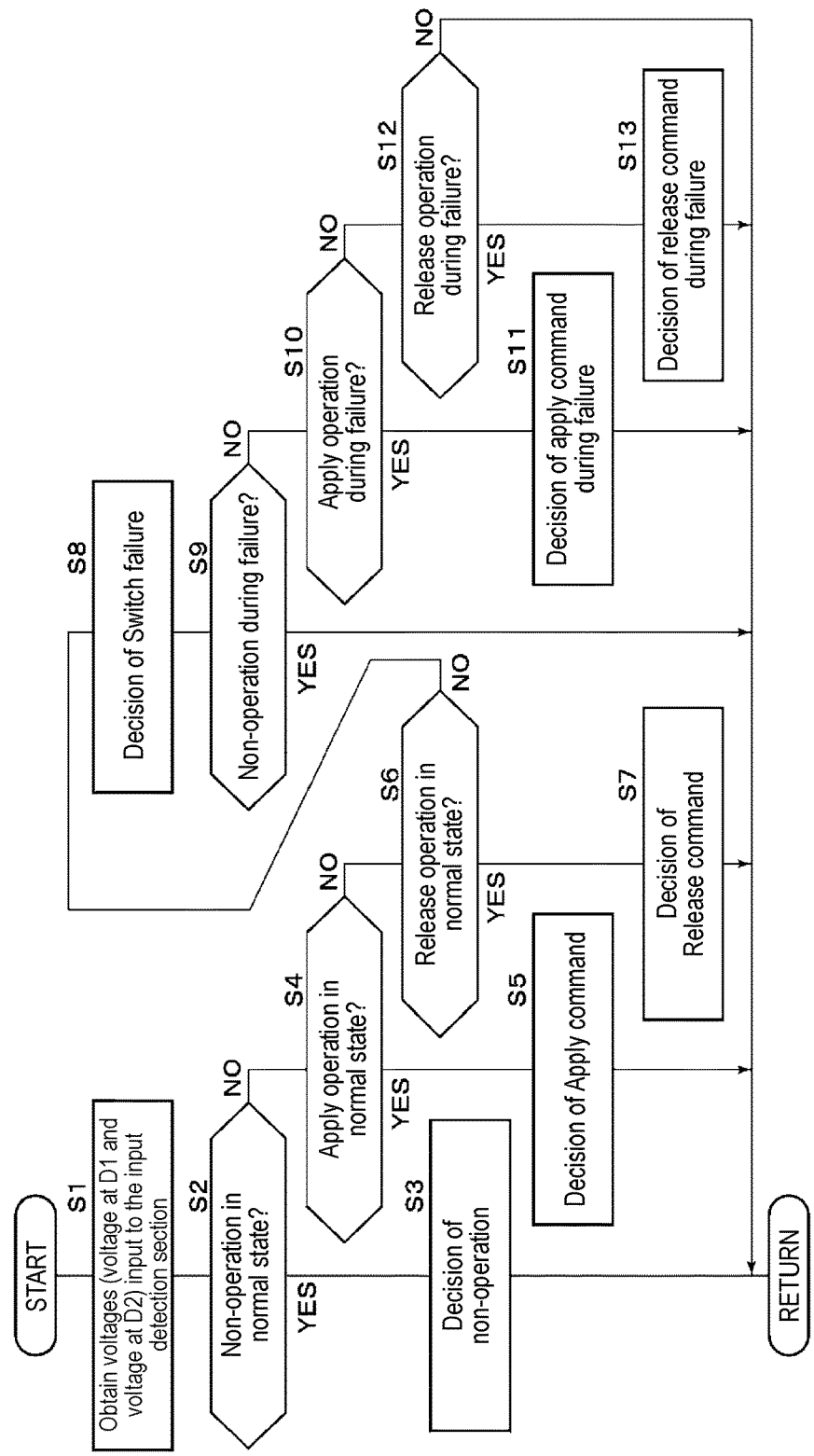
FIG. 6 is a flowchart of a determining process by a determination section of the parking brake control device of FIG. 2.
Figure 7:
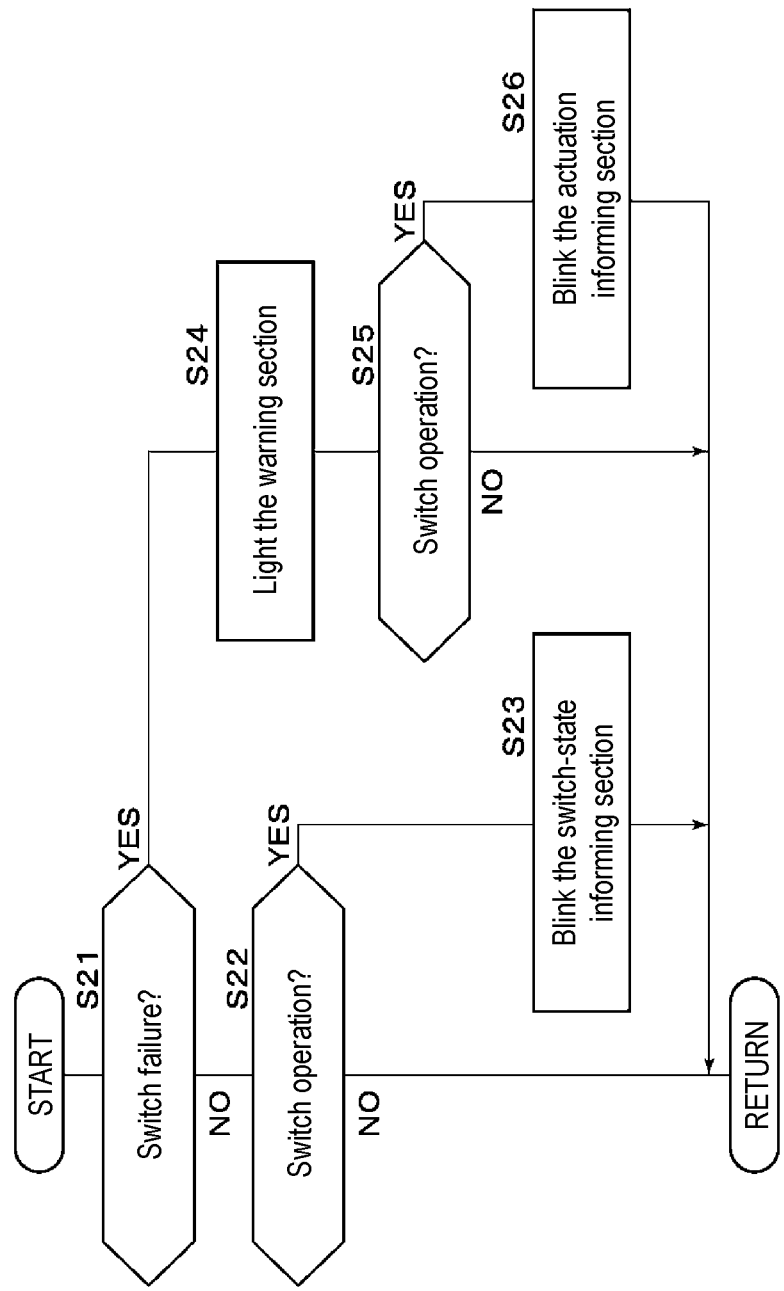
FIG. 7 is a flowchart of an informing process by the determination section of the parking brake control device of FIG. 2.

Now, operating switches and parking brake control devices according to the embodiments when they are mounted on a four-wheeled vehicle as an example will be described with reference to the accompanying drawings. It is to be noted that the steps in the flowcharts of FIGS. 6 and 7 are denoted using "S," e.g., "S1" for step 1.

Figure 1:
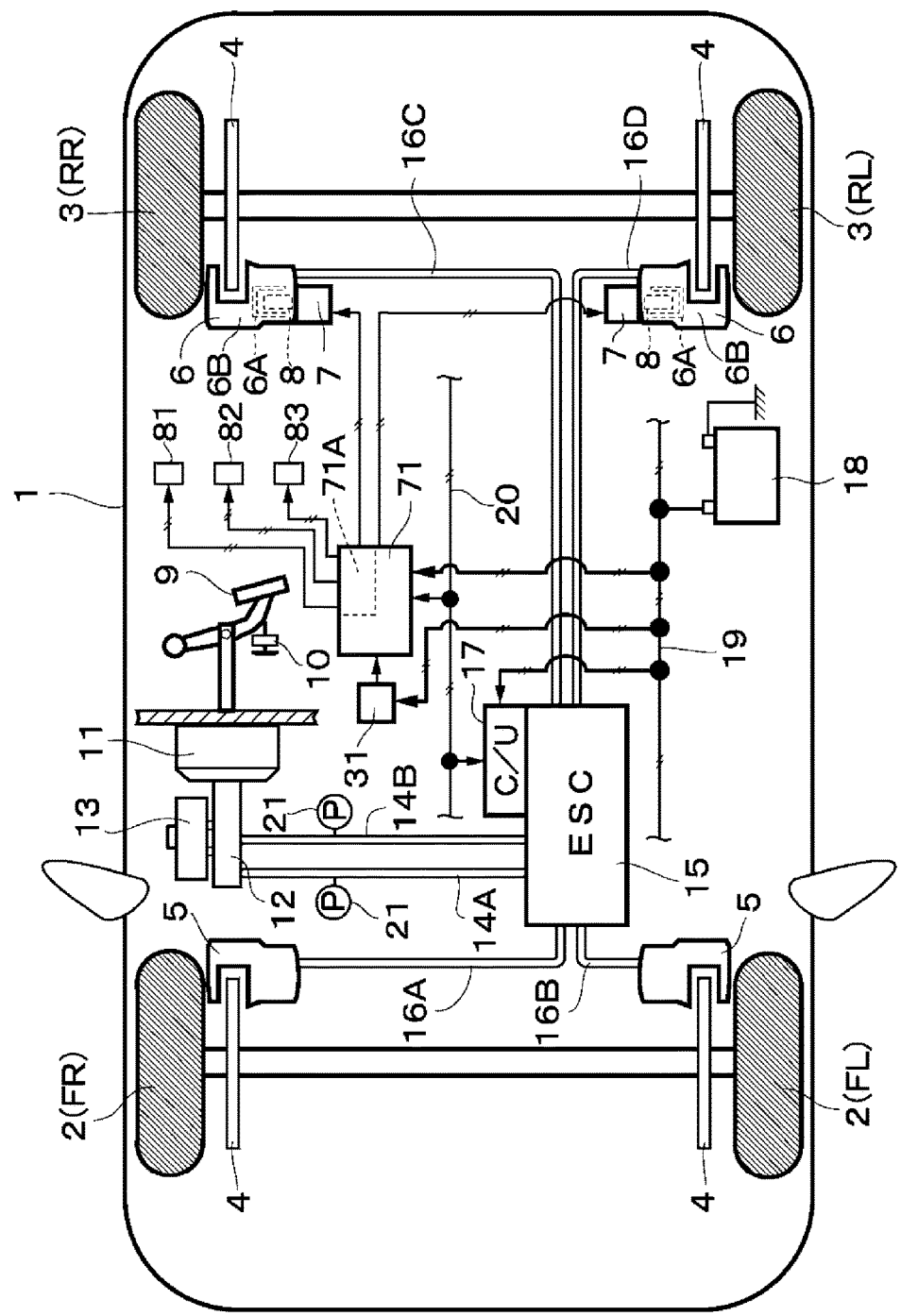
FIG. 1 is a conceptual view of a vehicle to which a parking brake switch and a parking brake control device according to one embodiment are mounted.

FIGS. 1 to 8 show the first embodiment. In FIG. 1, a vehicle body 1, forming the body of a vehicle, is provided, on the underside (road surface side) thereof, with a total of four wheels, e.g., left and right front wheels 2 (FL, FR) and left and right rear wheels 3 (RL, RR). The wheels (front wheels 2, rear wheels 3), together with the vehicle body 1, form the vehicle. A brake device (brake system) for applying brake force is mounted on the vehicle. Now, the brake device for the vehicle is described.

The front wheels 2 and the rear wheels 3 are each provided with a disc rotor 4 as a rotating member (a member to be braked) that rotates with the respective wheel (each front wheel 2, each rear wheel 3). A brake force is applied to the disk rotors 4 for the front wheels 2 by front-wheel disc brakes 5, which are hydraulic disc brakes. A brake force is applied to the disc rotors 4 for rear wheels 3 by rear-wheel disc brakes 6, which are hydraulic disc brakes having an electric parking brake function. In this way, brake force is individually applied to the wheels (each front wheel 2, each rear wheel 3), independently of each other.

Each of the pair (set) of rear-wheel disc brakes 6 for the left and right rear wheels 3 is an electric parking brake mechanism. The rear-wheel disk brakes 6, together with a parking brake control device 71, which will be described later, constitute an electric brake system (electric parking brake system). The rear-wheel disc brakes 6 includes for example, (a pair of) brake pads (not shown) disposed as friction members (braking members) to come into contact with the disc rotor 4, and a caliper (wheel cylinder) 6B that uses a piston 6A, which is a pressing member, to propel the brake pads, based on operation of a brake pedal 9.

The rear-wheel disc brakes 6 are provided with an electric motor 7 for propelling the piston 6A, and a pressing-member holding mechanism 8, such as a rotary-to-linear motion converting mechanism (e.g., a spindle/nut mechanism) that holds the piston 6A propelled by the electric motor 7. The rear-wheel disc brakes 6 utilize hydraulic pressure (brake fluid pressure) generated, for example, on the basis of the operation of the brake pedal 9, to propel the piston 6A and thus press the brake pads against the disc rotor 4, thereby applying brake force to the wheels (rear wheels 3) and hence the vehicle. Furthermore, as will be described later, the rear-wheel disc brakes 6 propel the piston 6A via the pressing-member holding mechanism 8 with the aid of the electric motor 7, according to an actuation command based on a signal or the like from a parking brake switch 31, thereby applying brake force (parking brake or auxiliary brake) to the vehicle.

The pair (set) of front-wheel disc brakes 5 for the left and right front wheels 2 have an approximately similar structure to the rear-wheel disc brakes 6, except for a mechanism relating to the actuation of parking brakes. In other words, the front-wheel disc brakes 5 do not have the electric motor 7, the pressing-member holding mechanism 8, etc. that actuate and release the parking brakes. However, the front-wheel disc brakes 5 are the same as the rear-wheel disc brakes 6 in propelling the piston 6A via hydraulic pressure generated on the basis of the operation of the brake pedal 9 or the like to apply brake force to the wheels (front wheels 2) and hence the vehicle.

The front-wheel disc brakes 5, similarly to the rear-wheel disc brakes 6, may be disc brakes having an electric parking brake function. This embodiment uses the hydraulic disc brakes 6 including the electric motors 7 as an electric parking brake mechanism. However, the electric parking brake mechanism is not limited thereto, and may use, for example, an electric disc brake including an electric caliper, an electric drum brake that applies braking force by pressing a shoe against a drum with the aid of an electric motor, a disc brake including a parking brake of electric drum type, a structure that applies a parking brake by pulling a cable with the aid of an electric motor, or the like. In other words, the electric parking brake mechanism may be any electric brake mechanism so long as it can press (thrust) a friction member (pad, shoe) against a rotating member (rotor, drum), based on the actuation of the electric motor (electric actuator), and hold and release the pressing force.

The vehicle body 1 is provided with the brake pedal 9 on its front board side. The brake pedal 9 is stepped on by a driver at the time of operating the vehicle brakes, and based on this operation, brake force is applied to and released from the disc brakes 5, 6 to serve as service brakes (service brakes). The brake pedal 9 is provided with a brake-lamp switch, a pedal switch, a brake-operation detecting sensor (brake sensor) 10 such as a pedal-stroke sensor.

The brake-operation detecting sensor 10 detects the presence or absence of an operation of stepping on the brake pedal 9 or the amount of such operation and outputs a corresponding detection signal to a controller 17 for a hydraulic-pressure feeding device. The detection signal from the brake-operation detecting sensor 10 is transmitted, for example, via a vehicle data bus 20 or a signal line (not shown) connecting the controller 17 for the hydraulic-pressure feeding device and the parking-brake control device 71 (is output to the parking-brake control device 71).

The operation of stepping on the brake pedal 9 is transmitted via a booster 11 to a master cylinder 12 that functions as a hydraulic pressure source. The booster 11 is structured as a vacuum booster or an electric booster provided between the brake pedal 9 and the master cylinder 12, and boost up the stepping force at the time of operation of stepping on the brake pedal 9 and deliver it to the master cylinder 12.

Then, using brake fluid fed from a master reservoir 13, the master cylinder 12 generates hydraulic pressure. The master reservoir 13 includes an actuation fluid tank containing brake fluid. The mechanism for generating hydraulic pressure by means of the brake pedal 9 is not limited to the above-described structure and, instead, may be a mechanism for generating hydraulic pressure in response to the operation of the brake pedal 9, for example, a brake-by-wire mechanism or the like.

The hydraulic pressure generated in the master cylinder 12 is transmitted, for example through a pair of cylinder-side hydraulic lines 14A, 14B to a hydraulic-pressure feeding device 15 (hereinafter referred to as the ESC 15). The ESC 15 is disposed between the disc brakes 5, 6 and the master cylinder 12, and distribute the hydraulic pressure from the master cylinder 12 via brake-side lines 16A, 16B, 16C, 16D to the disc brakes 5, 6. In this way, brake force is individually applied to the wheels (each front wheel 2, each rear wheel 3), independently of one another. In this case, the ESC 15 is capable of feeding hydraulic pressure to the disc brakes 5, 6, namely increasing the hydraulic pressure on the disc brakes 5, 6, also in a mode that does not correspond to the amount of operation of the brake pedal 9.

For this purpose, the ESC 15 has, for example, a dedicated control device including a microcomputer or the like, namely, the controller 17 for the hydraulic-pressure feeding device 17 (hereinafter referred to as the control unit 17). The control unit 17 opens and closes control valves (not shown) of the ESC 15 and performs actuation control for rotating and stopping an electric motor (not shown) for a hydraulic pressure pump to perform control for increasing, decreasing, or holding brake fluid pressure to be fed from the brake-side lines 16A-16D to the disc brakes 5, 6. In this way, a variety of brake controls are performed, such as boost control, braking-force distribution control, brake assist control, antilock brake control (ABS), traction control, vehicle stabilization control (including skid control), hill start assist control, and automatic drive control.

The control unit 17 is supplied with electric power via an electric power source line 19 from a battery 18, which is a vehicle electric power source. As shown in FIG. 1, the control unit 17 is connected to the vehicle data bus 20. The ESC 15 may be replaced with a known ABS unit. Alternatively, without the ESC 15 (that is, omitting it), the master cylinder 12 and the brake-side lines 16A-16D may be directly connected to each other.

The vehicle data bus 20 forms part of a CAN (Control Area Network) serving as a serial communication unit mounted on the vehicle body 1. The vehicle data bus 20 perform multiplex communication in the vehicle between a large number of onboard electronic instruments, the control unit 17, the parking-brake control device 71, etc. In this case, vehicle data transmitted to the vehicle data bus 20 is, for example, data (vehicle data) provided by a detection signal from the braking-operation detecting sensor 10, a pressure sensor 21 for sensing master cylinder hydraulic pressure (brake fluid pressure), an ignition switch, a seatbelt sensor, a door lock sensor, a door open sensor, a seat occupancy sensor, a vehicle-speed sensor, a steering angle sensor, an accelerator sensor (accelerator operation sensor), a throttle sensor, an engine-rotation sensor, a stereo camera, a millimeter-wave radar, a tilt sensor, a shift sensor, an acceleration sensor, a wheel-speed sensor, a pitch sensor for detecting the movement of a vehicle pitch direction, or the like.

Now, the parking brake switch 31 and the parking-brake control device 71 will be described.

The vehicle body 1 is provided therein with a parking brake switch (PKB SW) 31 as an operating switch near the driver seat (not shown). The parking brake switch 31 is an operation command section operated by the driver. The parking brake switch 31 sends to the parking brake control device 71 a signal (operation demand signal) corresponding to a demand (an apply demand that is a hold demand, and a release demand) for actuating the parking brakes in accordance with the driver's command for operation. In other words, the parking brake switch 31 outputs an actuation demand signal (an apply demand signal that is a hold demand signal, and a release demand signal) for putting the piston 6A and thus the brake pads into apply operation (hold operation) or release operation based on the actuation (rotation) of the electric motor 7 to the parking-brake control device 71, which is a control unit (controller).

When the parking brake switch 31 is operated to braking side (apply side) by the driver, that is, when an apply demand (hold demand, activation demand) for applying brake force to the vehicle is issued, the parking brake switch 31 outputs an apply demand signal. In this case, electric power for rotating the electric motor 7 to braking side is delivered via the parking-brake control device 71 to the electric motor 7 of the rear-wheel disk brake 6. At this time, the pressing-member holding mechanism 8 propels (presses) the piston 6A toward the disk rotor 4, based on the rotation of the electric motor 7, and holds the propelled piston 6A. This puts the rear-wheel disc brake 6 into a state in which brake force as a parking brake (or an auxiliary brake) is applied, namely, an apply state (hold state).

On the other hand, when the parking brake switch 31 is operated to brake release side, that is, when a release demand for releasing vehicle brake force is issued, the parking brake switch 31 outputs a release demand signal. In this case, electric power for rotating the electric motor 7 in the direction opposite to the braking side is delivered via the parking-brake control device 71 to the electric motor 7 of the rear-wheel disc brake 6. At this time, the pressing-member holding mechanism 8 releases the hold of the piston 6A by rotating the electric motor 7 (releases the pressing force exerted by the piston 6A). This puts the rear-wheel disc brake 6 into a state in which brake force as a parking brake (or an auxiliary brake) is released, namely, a release state.

The parking brakes may be configured to automatically apply (auto-apply), based on an automatic apply demand in accordance with a parking-brake apply determination logic in the parking-brake control device 71, for example when the vehicle has stopped for a predetermined time (e.g., the vehicle is determined to be at rest when the speed detected by the vehicle speed sensor has continued to be lower than 4 km/h for a predetermined time as the running vehicle decelerates), when the engine is stopped, when the shift lever is put into P, when a door is opened, or when a seatbelt is unbuckled, or the like. The parking brakes may be configured to automatically release (auto-release), based on an automatic release demand in accordance with a parking-brake release determination logic in the parking-brake control device 71, for example when the vehicle runs (e.g., the vehicle is determined to run when the speed detected by the vehicle speed sensor has continued to be 5 km/h or higher for a predetermined time as the vehicle accelerates from rest), when the accelerator pedal is operated, when the clutch pedal is operated, when the shift lever is put into any position other than P or N, or the like. The auto-apply and the auto-release may be configured as an auxiliary function in the event of switch failure to automatically apply or release brake force when the parking brake switch 31 fails.

When an apply demand is issued through the parking brake switch 31 while the vehicle is running, more specifically when there is a dynamic parking brake (dynamic apply) demand, for example, for using the parking brakes as auxiliary brakes in an emergency situation while the vehicle is running, the parking-brake control device 71 applies and releases brake force in accordance with operation of the parking brake switch 31. For example, the parking-brake control device 71 applies brake force while the parking brake switch 31 is operated to braking side (while operation to the braking side is kept), and releases brake force when that operation ends. For such a situation, the parking-brake control device 71 may be configured to automatically apply and release brake force (ABS control), according to the condition of wheels (each rear wheel 3), that is, whether the wheels are locking (slipping).

The parking-brake control device 71, together with a pair of left and right rear-wheel disc brakes 6, 6, constitutes an electric brake system (electric parking brake system). The parking-brake control device 71 is supplied with electric power from the battery 18 through the electric power source line 19. The parking-brake control device 71 controls electric motors 7, 7 at the rear-wheel disc brakes 6, 6 to generate brake force (parking brake, auxiliary brake) when the vehicle is parked or stopped (when the vehicle is driven as required). In other words, the parking-brake control device 71 actuates (applies, or releases) the disc brakes 6, 6 as parking brakes (auxiliary brakes as required) by activating the left and right electric motors 7, 7.

For this purpose, the parking-brake control device 71 is connected on its input side to the parking brake switch 31 and on output side to the electric motors 7, 7 at the respective parking brakes 6, 6. The parking-brake control device 71 drives the left and right electric motors 7, 7, based on a actuation demand (apply demand, or release demand) through operation of the parking brake switch 31 by the driver, an actuation demand from a determination logic for parking-brake apply/release, or an actuation demand under ABS control, to apply (hold) or release the left and right disc brakes 6, 6.

At this time, in the rear-wheel disc brakes 6, the pistons 6A and brake pads are held or released by the pressing-member holding mechanism 8, based on operation of the electric motors 7. In this way, the parking-brake control device 71 performs actuation control of the electric motor 7 in response to an actuation demand signal for holding (applying) the pistons 6A (and thus the brake pads) or an actuation demand signal for release operation (release), to propel the pistons 6A (and thus the brake pads).

The parking-brake control device 71 is connected, not only to the parking brake switch 31, but also to the vehicle data bus 20. A variety of vehicle state quantities required for parking brake control (actuation), i.e., vehicle data can be obtained from the vehicle data bus 20.

The vehicle data available obtained from the vehicle data bus 20 may be obtained by directly connecting a sensor for detecting such data to the parking-brake control device 71. The parking-brake control device 71 may be so configured that an actuation demand based on the above-described determination logic or ABS control is input from another control device (e.g., the control unit 17) connected to the vehicle data bus 20 to the parking-brake control device 71.

In this case, the above-described parking-brake apply/release determination through the determination logic or ABS control may be performed, not by the parking-brake control device 71, but by another control device, for example, the control unit 17. In other words, it is possible to incorporate into the control unit 17 the control that would otherwise be performed by the parking-brake control device 71.

The parking-brake control device 71 includes memory 71A as a storage section including, for example, flash memory, ROM, RAM, EEPROM, or the like. The memory 71A stores a program for the above-described parking-brake apply/release determination logic or ABS control. Furthermore, the memory 71A stores processing programs for executing processing flows shown in FIGS. 6 and 7 (described later), namely, a processing program for determining the operation and any failure (wire disconnection) of the parking brake switch 31 (FIG. 6) and a processing program for informing the operation and any failure (wire disconnection) of the parking brake switch 31 (FIG. 7). The memory 71A also stores a table for determination of operation of the parking brake switch 31 shown in FIG. 8 (described later), that is, (data corresponding to) a list of the relations between operation modes of the parking brake switch 31 in non-failure (normal) state and failure (wire disconnection) state and voltages output from the parking brake switch 31.

Further, the parking-brake control device 71 is connected to a warning device 81, an actuation informing device 82, and a switch-state informing device 83, which are located near the driver's seat. These warning device 81, actuation informing device 82, and switch-state informing device 83 will be described later.

In the embodiments, the parking-brake control device 71 is separate from the control unit 17 of the ESC 15. Instead, the parking-brake control device 71 may be integrated with the control unit 17. The parking-brake control device 71 controls the two rear-wheel disc brakes 6, 6 on the left and right sides. Instead, the left and right rear-wheel disc brakes 6, 6 may each be provided with the parking-brake control device 71. In this case, the parking-brake control devices 71 may be integrated with the respective rear-wheel disc brakes 6.

The brake device (brake system) for a four-wheeled vehicle according to the embodiment includes the above-described configuration and operates in the following manner.

When the vehicle driver steps on the brake pedal 9, the pedal force is transmitted through the booster 1 to the master cylinder 12, which in turn generates brake fluid pressure. The brake fluid pressure generated in the master cylinder 12 is distributed via the cylinder-side hydraulic lines 14A, 14B, ESC 15, and brake-side lines 16A, 16B, 16C, 16D to the disc brakes 5, 6 to apply brake force to the left and right front wheels 2 and the left and right rear wheels 3.

In each of the disc brakes 5, 6, as the brake fluid pressure rises in the caliper 6B, the piston 6A slidingly moves toward the brake pads to press them on the disc rotor 4. In this way, brake force based on the brake fluid pressure is applied. On the other hand, when the brake operation is released, the supply of brake fluid pressure into the caliper 6B is stopped, so that the piston 6A moves away (retracts) from the disc rotor 4. This separates the brake pads from the disc rotor 4 and puts the vehicle in non-braking state.

Next, when the vehicle driver puts the parking brake switch 31 to the braking side (apply side), the parking-brake control device 71 energizes the electric motor 7 at the rear-wheel disc brake 6 to turn the electric motor 7. In the rear-wheel disc brake 6, rotary motion of the electric motor 7 is converted by the pressing-member holding mechanism 8 into linear motion to propel the piston 6A. In this way, the disc rotor 4 is pressed by the brake pads. At this time, the pressing-member holding device 8 utilizes friction force (holding force), for example generated by threaded engagement, to keep the braking state, so that the rear-wheel disc brake 6 operates (applies) as a parking brake. That is, even when the electric motor 7 is no longer energized, the pressing-member holding mechanism 8 holds the piston 6A in the brake position.

On the other hand, when the driver puts the parking brake switch 31 to the brake release side, the parking-brake control device 71 energizes the electric motor 7 for reverse rotation, so that the electric motor 7 turns in the opposite direction to the direction at the time of parking brake actuation (apply). At this time, the pressing-member holding mechanism 8 releases the brake force hold, allowing the piston 6A to move away (retract) from the disc rotor 4. In this way, the operation of the rear-wheel disc brake 6 as a parking brake is released.

Patent Literature 1 describes a technique for detecting any failure of an input device for operating electric parking brakes, using a control device. However, this technique described in Patent Literature 1 may require a larger number of parts and a resulting cost increase. More specifically, the technique of Patent Literature 1 may require a larger number of resistors, a larger number of control lines, and a larger number of terminals, resulting in an a cost increase. In other words, this may discourage a demand for integration of electronic circuits, a reduction in area for mounting parts, and a reduction in the number of control controller input/output ports.

Figure 2:
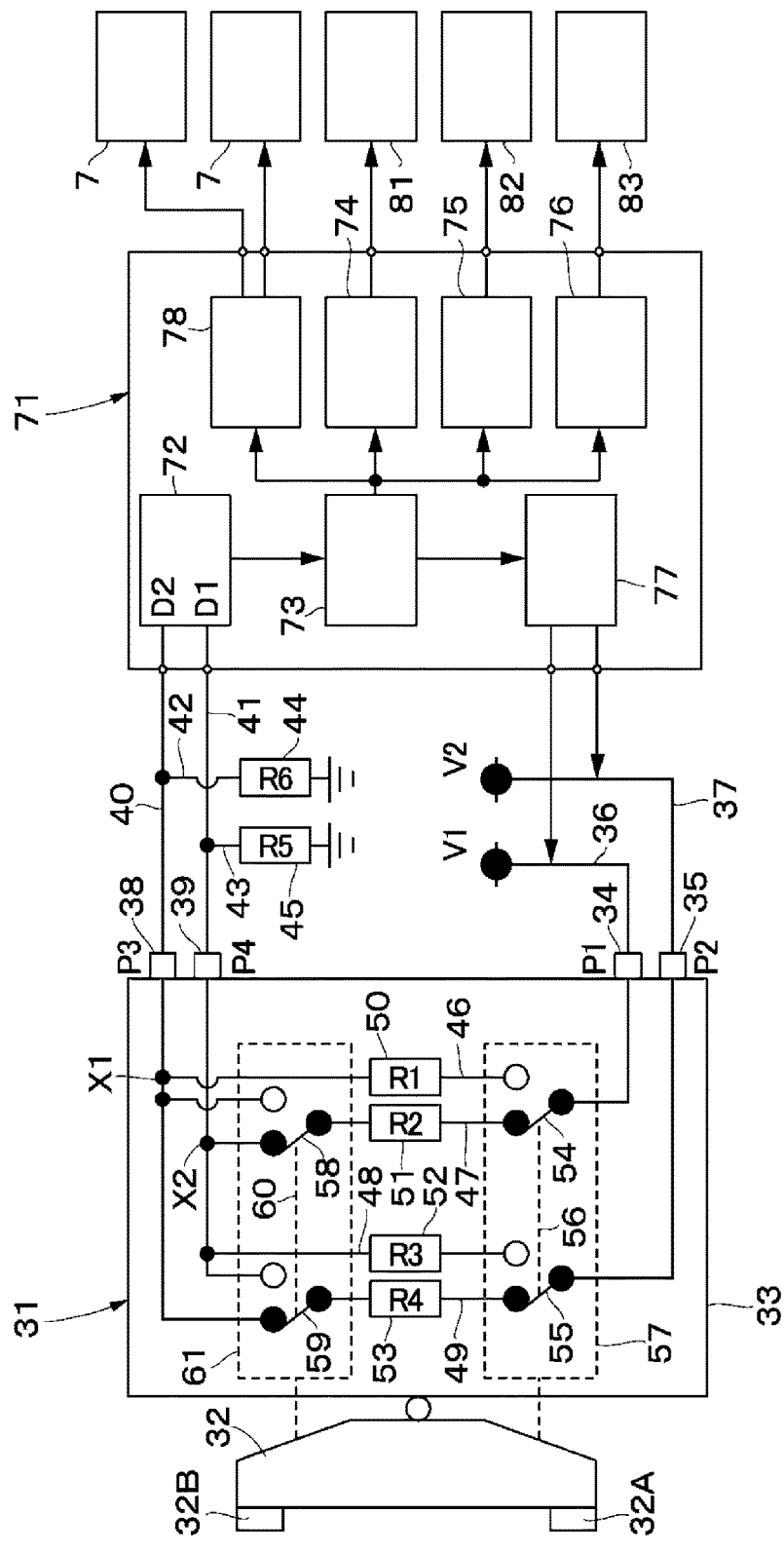
FIG. 2 is a circuit diagram of the parking brake switch and the parking brake control device of FIG. 1 according to a first embodiment.

To address this, the parking brake switch 31 and the parking-brake control device 71 of the embodiment are configured as shown in FIG. 2. Below, the parking brake switch 31 and the parking-brake control device 71 of the embodiment will be described with reference to FIG. 2 as well as FIG. 1.

The parking brake switch 31 is an operating switch for commanding actuation of the rear-wheel disc brakes 6 as an electric parking brake mechanism. Specifically, the parking brake switch 31 commands a non-operation mode, a brake actuation mode, and a brake release mode, as operations of the electric parking brake mechanism. The parking brake switch 31 includes an operating section 32 operated by the driver and an input device 33 to which an operation on is input from the operating section 32.

Figure 3:
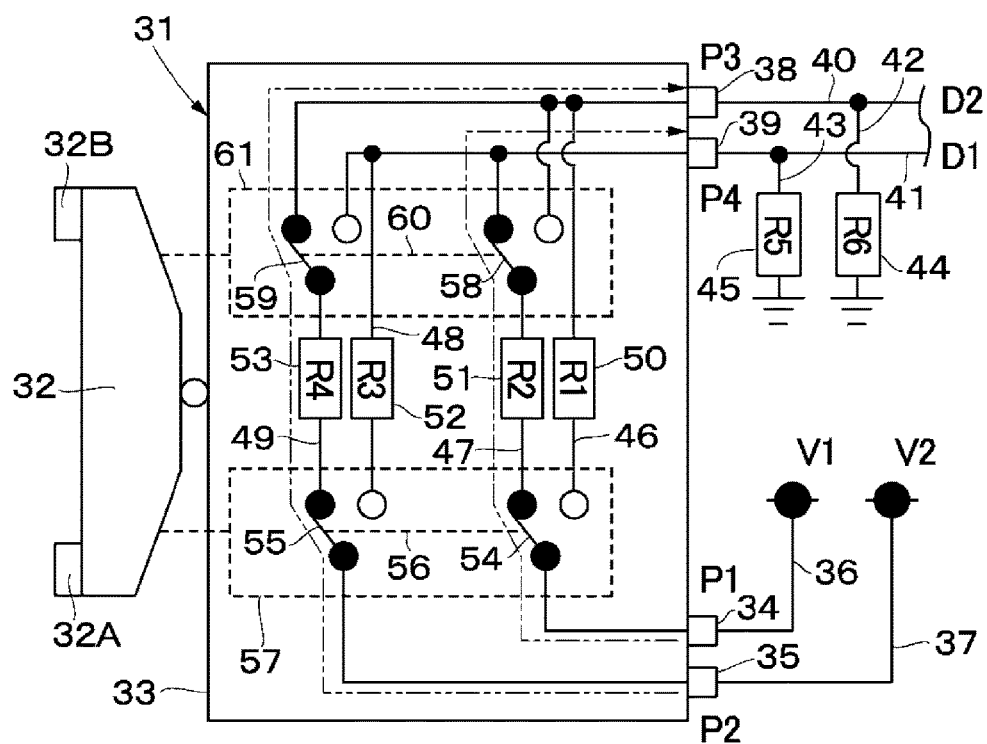
FIG. 3 is a circuit diagram of the parking brake switch in non-operation mode.

The operating section 32 of the parking brake switch 31 includes an actuation command side operating section 32A and a release command side operating section 32B. When the driver is not using the operating section 32, the state of non-operation mode shown in FIGS. 2 and 3 is maintained. To apply (hold) the parking brakes (to shift from release state to apply state), the driver presses (pushes down) the actuation command side operating section 32A with a finger to shift the operating section 32 from the non-operation mode shown in FIGS. 2 and 3 into the brake actuation mode shown in FIG. 4. When the driver removes his/her finger from the actuation command side operating section 32A, the operating section 32 reverts to the position of non-operation mode shown in FIGS. 2 and 3 based on resilient force of an unillustrated spring or the like.

Figure 5:
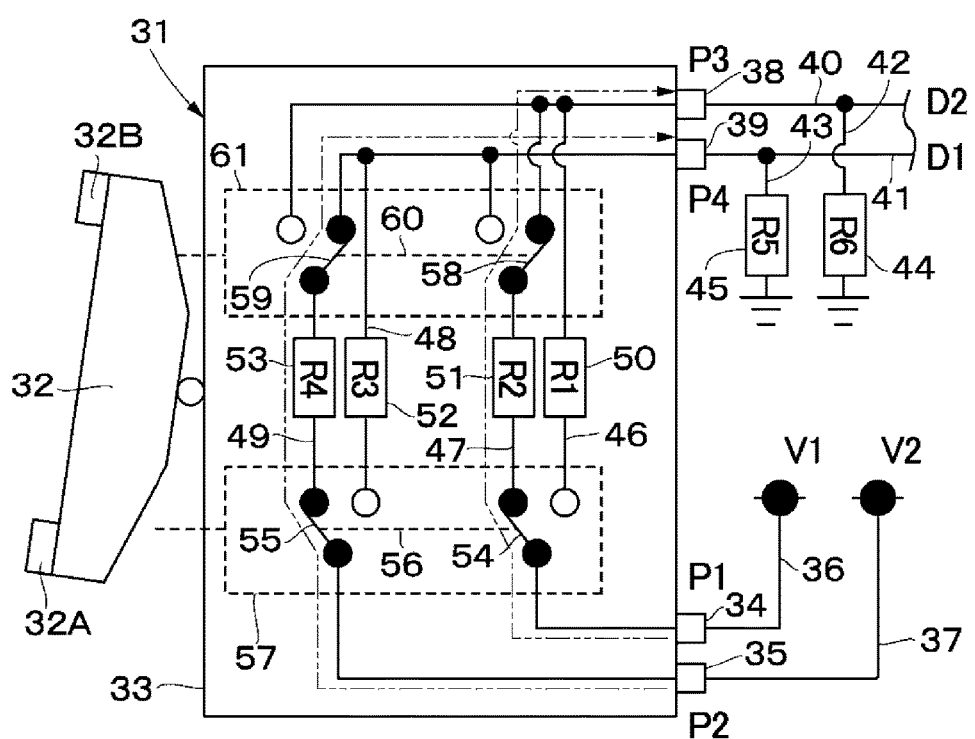
FIG. 5 is a circuit diagram of the parking brake switch in brake release mode.

On the other hand, to release the parking brakes (to shift from the apply state to the release state), the driver presses (pushes down) the release command side operating section 32B with a finger to shift the operating section 32 from the non-operation mode shown in FIGS. 2 and 3 to the release operation mode shown in FIG. 5. When the driver removes his/her finger from the release command side operating section 32B, the operating section 32 reverts to the position of non-operation mode shown in FIGS. 2 and 3 based on resilient force of the unillustrated spring or the like. The structure of the operating section 32 is not limited to the illustrated one and may, for example, be so configured that for parking brake apply, the actuation command side operating section is pulled with a finger, and that for parking brake release, the actuation command side operating section is pushed with a finger. In short, a suitable configuration may be selected from various options for the parking brake switch operating section, in accordance with the vehicle specifications, the mounting location, operability, and so on.

The input device 33 of the parking brake switch 31 includes two input terminals 34, 35, two output terminals 38, 39, four resistance wires 46, 47, 48, 49, two first switches elements 54, 55 that are integrally formed, and two second switch elements 58, 59 that are integrally formed.

A battery 18, which is a vehicle power source, is connected to the two input terminals 34 via the electric power source line 19 and an unillustrated electric power source conversion circuit. In this case, the input terminals 34, 35 are each supplied with a different level of voltage. Specifically, one input terminal 34, labeled "P1" in the drawings (hereinafter referred to as the first input terminal 34), is supplied with an input voltage V1 via an input line 36 (hereinafter referred to as the first input line 36), which is one of two input lines 36, 37. The other input terminal 35, labeled "P2" in the drawings (hereinafter referred to as the second input terminal 35), is supplied with an input voltage V2 of a different voltage level from the input voltage V1 via the other input line 37 (hereinafter referred to as the second input line 37). In this case, it may be that for example, V1>V2.

Two output terminals 38, 39 are connected to (an input detection section 72 of) the parking-brake control device 71. A signal that varies according to the operation mode of the operating section 32 (the switching position of the first switch elements 54, 55 and the second switch elements 58, 59) is output from each of the two output terminals 38, 39. For this purpose, the input device 33 is provided therein with four resistance elements 50, 51, 52, 53, which will be described later. In other words, the two output terminals 38, 39 output respective signals that differ from each other, according to the operation mode through the resistance elements 50, 51, 52, 53 disposed in the input device 33. In this case, the one output terminal 38, labeled "P3" in the drawings (hereinafter referred to as the first output terminal 38), is connected via an output line 40 (hereinafter referred to as the first output line 40), which is one of two output lines 40, 41, to (the input detection section 72 of) the parking-brake control device 71. The other output terminal 39 (hereinafter referred to as the second output terminal 39), labeled "P4" in the drawings, is connected via the other output line 41 (hereinafter referred to as the second output line 41) to (the input detection section 72 of) the parking-brake control device 71.

The first output line 40 is connected (grounded) via a first branch output line 42 to ground. The first branch output line 42 is provided with a resistance element 44 located between a connection of the first branch output line 42 to the first output line 40 and the ground. The resistance element 44 is one (hereinafter referred to as the first outer resistance element 44) that is provided outside the input device 33 and is set, for example, to resistance value R6. The second branch output line 41 is connected (grounded) via a second branch output line 43 to the ground. The second branch output line 43 is provided with a resistance element 45 between a connection of the second branch output line 43 to the second output line 41 and the ground. The resistance element 45 is one (hereinafter referred to as the second outer resistance element 45) provided outside the input device 33 and is set, for example, to resistance value R5.

The voltages output from the two output terminals 38, 39 are applied to the input detection section 72 of the parking-brake control device 71. As will be described later, a determination section 73 of the parking-brake control device 71 determines the operation mode of the parking brake switch 31 (the operation mode of the operating section 32) and any failure (wire disconnection) of the parking brake switch 31, based on the voltages detected by the input detection section 72, namely, the voltage from the second output terminal 39 applied to "D1" shown in the drawings and the voltage from the first output terminal 38 applied to "D2" shown in the drawings.

Four resistance wires 46, 47, 48, 49 are each provided for a respective pair of the two input terminals 34, 35 and the two output terminals 38, 39 between the input terminals 34, 35 and the output terminals 38, 39. In other words, a total of four resistance wires 46, 47, 48, 49 are provided between the two input terminals 34, 35 and the two output terminals 38, 39. One input terminal 34 and one output terminal 38 are provided therebetween with two of the resistance wires 46, 47, 48, 49, and the other input terminal 35 and the other output terminal 39 are provided therebetween with the other two of the resistance wires 46, 47, 48, 49.

The four resistance wires 46, 47, 48, 49 include resistance elements 50, 51, 52, 53, respectively. These four resistance elements 50, 51, 52, 53 are set to different resistance values. Specifically, when the resistance value of the first resistance element 50 is set to R1, the resistance value of the second resistance element 51 to R2, the resistance value of the third resistance element to R3, and the resistance value of the fourth resistance element 53 to R4, the resistances R1, R2, R3, R4 differ from one another.

Of the four resistance wires 46, 47, 48, 49, the resistance wire 46, which includes the first resistance element 50 having resistance value R1, is referred to as R1 resistance wire 46. The resistance wire 47, which includes the second resistance element 51 having resistance value R2, is referred to as R2 resistance wire 47. The resistance wire 48, which includes the third resistance element 52 having resistance value R3, is referred to as the R3 resistance wire 48. The resistance wire 4, which includes the fourth resistance element 53 having resistance value R4, is referred to as R4 resistance wire 49.

The four resistance wires 46, 47, 48, 49 may be divided into two wirings (one wiring and the other wiring). More specifically, the four resistance wires 46, 47, 48, 49 may be divided into a set of the R2 resistance wires 47 and the R4 resistance wire 49 as first resistance wires (one wiring), which is connected to the respective output terminals 38, 39, and another set of the R1 resistance wire 46 and the R3 resistance wire 48 as the other two second resistance wires (the other wiring).

Of the four resistance wires 46, 47, 48, 49, the R2 resistance wire 47 and the R4 resistance wire 49, which are first resistance wires (one wiring), are connected to the second switch elements 58, 59. On the other hand, the R1 resistance wire 46 and the R3 resistance wire 48, which are second resistance wires (the other wiring), are connected to the output terminals 38, 39, which are paired up with the input terminals 34, 35. That is, the two input terminals 34, 35 and the output terminals 38, 39 are such that the first input terminal 34 and the first output terminal 38 form one pair and the second input terminal 35 and the second output terminal 39 form another pair. The R1 resistance wire 46 is connected to the first output terminal 38, which is paired up with the first input terminal 34, and the R3 resistance wire 48 is connected to the second output terminal 39, which is paired up with the second input terminal 35.

The first switch elements 54, 55 are provided for the two input terminals 34, 35, respectively, and switch the connections to the two wirings (one wiring and the other wiring) in response to actuation commands from the operating section 32, namely, a non-operation mode, a brake actuation mode, and a brake release mode. In other words, the first switch elements 54, 55 simultaneously switch, to the two input terminals 34, 35, the R2 resistance wire 47 and the R4 resistance wire 49, which are two first resistance wires (one wiring), and the R1 resistance wire 46 and the R3 resistance wire 48, which are the other two second resistance wires (the other wiring), according to a given mode command.

The two first switch elements 54, 55 are integrally connected by a coupler 56, and the two first switch elements 54, 55 and the coupler 56 constitute a first switching section 57. The first switching section 57 is configured such that the two first switch elements 54, 55 are simultaneously switched by being switched according to operation of the operating section 32 (the actuation command side operating section 32A).

As shown in FIGS. 2 and 3, when the actuation command is non-operation, the first switch elements 54, 55 connect the R2 resistance wire 47 and the R4 resistance wire 49, which are the first resistance wires (one wiring) to the two input terminals 34, 35. In other words, in the non-operation mode of FIGS. 2 and 3 (and the brake release mode of FIG. 5), one first switch element 54 connects the first input terminal 34 and the R2 resistance wire 47, and the other first switch element 55 connects the second input terminal 35 and the R4 resistance wire 49.

Figure 4:
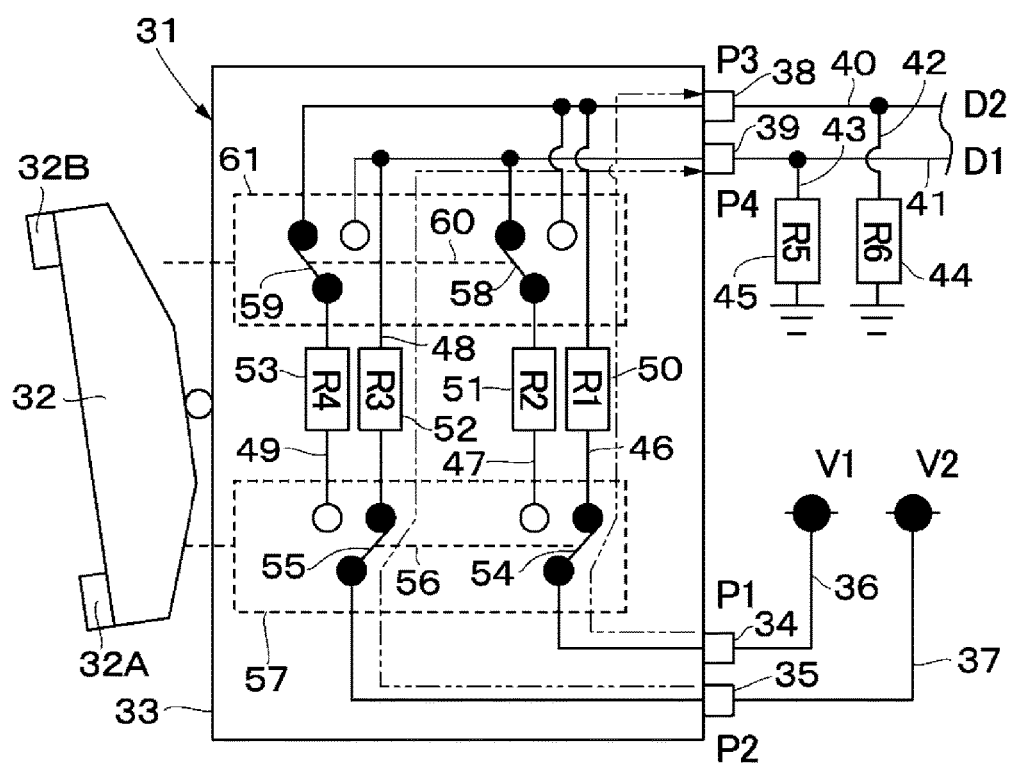
FIG. 4 is a circuit diagram of the parking brake switch in brake actuation mode.

On the other hand, as shown in FIG. 4, when the actuation command is not the non-operation, more specifically when the actuation command is the brake actuation mode, the first switch elements 54, 55, connect the R1 resistance wire 46 and the R3 resistance wire 48, which are the second resistance wires (the other wiring), to the two input terminals 34, 35. That is, in the brake actuation mode of FIG. 4, one first switch element 54 connects the first input terminal 34 and the R1 resistance wire 46, and the other first switch element 55 connects the second input terminal 35 and the R3 resistance wire 48.

The second switch elements 58, 59 are connected to the one wiring, of the two wirings (one wiring and the other wiring), that is put into connection when the actuation command is non-operation in the first switch elements 54, 55, namely, the R2 resistance wire 47 and the R4 resistance wire 49, which are first resistance wires. In response to an actuation command, the second switch elements 58 and 59 switch the connections between the R2 resistance wire 47 and the R4 resistance wire 49, and the two output terminals 38, 39. In other words, in response to a mode command, the second switch elements 58, 59 simultaneously switch, to each of the R2 resistance wire 47 and the R2 resistance wire 49 which are the two first resistance wires, the output terminals 38, 39 different from each other.

The two second switch elements 58, 59 are integrally connected by coupler 60, and the two second switch elements 58, 59 and the coupler 60 constitute a second switching section 61. The second switching section 61 is configured such that the two second switch elements 58, 59 are simultaneously switched by being switched according to operation of the operating section 32 (the release command side operating section 32B).

As shown in FIGS. 2 and 3, when the actuation command is non-operation, the second switch elements 58, 59 connect the R2 resistance wire 47 and the R4 resistance wire 49, which are the first resistance wires (one wiring), to the two output terminals 38, 39. In other words, in the non-operation mode of FIGS. 2 and 3 (and the brake actuation mode of FIG. 4), one second switch element 58 connects the R2 resistance wire 47 and the second output terminal 39, and the other second switch element 59 connects the R4 resistance wire 49 and the first output terminal 38.

On the other hand, as shown in FIG. 5, when the actuation command is not non-operation, more specifically when the actuation command is the brake release mode, the second switch elements 58, 59 connect the R2 resistance wire 47 and the R4 resistance wire 49 to the two output terminals 38, 39 in a manner reverse to that in the non-operation mode of FIGS. 2 and 3 (and the brake actuation of FIG. 4). That is, in the brake release mode of FIG. 5, one second switch element 58 connects the R2 resistance wire 47 and the first output terminal 38, and the other second switch element 59 connects the R4 resistance wire 49 and the second output terminal 39.

As shown in FIGS. 2 and 3, when the driver is not operating the operating section 32 of the parking brake switch 31 (at the time of non-operation), the second resistance element 51 is connected between the first input terminal 34 and the second output terminal 39, and the fourth resistance element 53 is connected between the second input terminal 35 and the first output terminal 38. On the other hand, as shown in FIG. 4, when the driver operates the operating section 32 (presses the actuation command side operating section 32A) to apply the parking brakes, the first switch elements 54, 55 of the first switching section 57 are switched together so that the first resistance element 50 is connected between the first input terminal 34 and the first output terminal 38, and the third resistance element 52 is connected between the second input terminal 35 and the second output terminal 39. In other words, the resistances connected between the first terminals 34, 35 and the output terminals 38, 39 are changed, based on the switching of the two first switch elements 54, 55. This changes the voltages input to (D1, D2 of) the parking-brake control device 71 from those at the time of non-operation (and release actuation), making it possible for the parking-brake control device 71 to detect a parking brake actuation demand from the driver.

On the other hand, as shown in FIG. 5, when the driver operates the operating section 32 (presses the release command side operating section 32B) to release the parking brakes, the second switch elements 58, 59 of the second switching section 61 are switched together, so that the second resistance element 51 is connected between the first input terminal 34 and the first output terminal 38, and the fourth resistance element 53 is connected between the second input terminal 35 and the second output terminal 39. In other words, the resistances connected between the input terminals 34, 35 and the output terminals 38, 39 are changed based on the switching of the two second switch elements 58, 59. This changes the voltages input to (D1, D2 of) the parking-brake control device 71 from those at the time of non-operation (and release actuation), making it possible for the parking-brake control device 71 to detect a parking brake release actuation demand from the driver.

FIG. 8 shows a voltage pattern (voltage application pattern) input (applied) to (D1, D2 of) the parking-brake control device 71, that is, a voltage pattern detected by (D1, D2 of) the parking-brake control device 71. Input voltage V1 and input voltage V2 are different voltage values (V1≠V2). The voltages input (applied) to (D1, D2 of) the parking-brake control device 71 vary, depending on the resistance elements 50, 51, 52, 53 connected in the input device 33 of the parking brake switch 31. In an actual circuit, they are eventually determined by the voltage division ratio between the resistance elements 50, 51, 52, 53 connected in the input device 33, and the outer resistance elements 44, 45.

In FIG. 8, the voltage division ratio when connects the first input terminal 34 and the second output terminal 39 are connected via the second resistance element 51 is denoted as A, the voltage division ratio when the second input terminal 35 and the first output terminal 38 are connected via the fourth resistance element 53 is denoted as B, the voltage ratio when the first input terminal 34 and the first output terminal 38 are connected via the first resistance element 50 is denoted as C, and the voltage ratio when the second input terminal 35 and the second output terminal 39 are connected via the third resistance element 52 is denoted as D.

In addition to the normal voltage pattern, FIG. 8 shows a voltage pattern in the event of failure (wire disconnection). "P1 disconnection" in FIG. 8 represents a voltage when there is no input of the input voltage V1, e.g., when the first input terminal 34 fails, when the first input line 36 is disconnected, or when a portion between the first input terminal 34 and one first switch element 54 is disconnected. "P2 disconnection" represents a voltage when there is no input of the input voltage V2, e.g., when the second input terminal 35 fails, when the second input line 37 is disconnected, or when a portion between the second input terminal 35 and the other first switch element 55 is disconnected. "P3 disconnection" represents a voltage when there is no output of the first output terminal 38, e.g., when the first output terminal 38 fails, when a portion between a connection X1 in FIG. 2 and the first output terminal 38 is disconnected, or when the first output line 40 is disconnected. "P4 disconnection" represents a voltage when there is no output of the second output terminal 39, e.g., when the second output terminal 39 fails, when a portion between a connection X2 in FIG. 2 and the second output terminal 39 is disconnected, or when the second output line 41 is disconnected.

As shown in FIG. 8, normally, each of the voltage patterns detected at (D1, D2 of) the parking-brake control device 71 differs between non-operation, actuation operation, and release operation. This enables the parking-brake control device 71 to detect the driver's operation (demand). On the other hand, a wire disconnection sets the voltage on the disconnected side to zero. Also in the event of any wire disconnection, each of the voltage patterns detected at (D1, D2 of) the parking-brake control device 71 differs between non-operation, actuation operation, and release operation. For this reason, when any wire disconnection occurs, it is possible to detect, not only a wire disconnection, but also the driver's operation (demand).

Now, the parking-brake control device 71 will be described below.

The parking-brake control device 71 detects operation modes of non-operation, actuation command (apply command), and release command (release command) by applying a voltage to the parking brake switch 31, which commands actuation of the rear-wheel disc brakes 6 serving as an electric parking brake mechanism. For this purpose, the parking-brake control device 71 is connected to the output terminals 38, 39 of the parking brake switch 31.

The parking-brake control device 71 includes an input detection section 72 as a detection unit; a determination section 73 that, together with the input detection section 72, forms the detecting unit; a warning section 74 as a informing unit (failure informing unit); a actuation informing section 75 as a informing unit (actuation-state informing unit); a switch-state informing section 76; a signal blocking section 77; and an electric-motor drive section 78. The parking-brake control device 71 is configured to issue a notice, using the warning section 74 and the actuation informing section 75, which are two separate informing unit, based on a result detected by the input detection section 72 and the determination section 73. More specifically, upon detection of a switch failure by the input detection section 72 and the determination section 73, the parking-brake control device 71 issues a failure notice from the warning section 74, and if an operation of the parking brake switch 31 is detected by the input detection section 72 and the determination section 73 while the failure notice is being issued, the actuation informing section 75 issues a notice that the operation cannot be accepted, using the actuation informing section 75, which is a informing unit that is different from the warning section 74.

The input detection section 72 is connected to the output terminals 38, 39 of the parking brake switch 31. A voltage that is output from the output terminals 38, 39 is input to the input detection section 72. As such, the input detection section 72 serves as a voltage detection section that detects voltages output from the output terminals 38, 39 and thus includes two detection sections (input sections) labeled "D1" and "D2" in the figures. The input detection section 72 is connected to the determination section 73 and outputs voltages of the output terminals 38, 39 to the determination section 73.

The determination section 73 determines the operation mode of the parking brake switch 31 and the presence of any failure (wire disconnection), based on the voltages at the output terminals 38, 39 detected by the input detection section 72. In other words, the determination section 73 constantly monitors the voltage detected by the input detection section 72. The determination section 73 determines the operation mode of the parking brake switch 31 and the presence of any failure (wire disconnection) from voltage values at "D1" and "D2," based on the table for determination of the operation of the parking brake switch 31 shown in FIG. 8. In the embodiment, the input detection section 72 and the determination section 73 constitute a detection unit configured to detect the operation mode of the parking brake switch 31 and any switch failure on the basis of output values (voltage values) at the output terminals 38, 39 when voltage is applied to the input terminals 34, 35 which are contacts of the parking brake switch 31.

The determination section 73 is connected to the electric-motor drive section 78. The electric-motor drive section 78 serves, for example, as a drive circuit for driving the electric motors 7, 7 of the left and right rear-wheel disc brakes 6, 6 and is connected to the electric motors 7, 7. The electric-motor drive section 78 feeds electric power to the electric motors 7, 7 to drive them. The determination section 73 determines the operation of the parking brake switch 31 and the presence of any failure, based on a processing flow for determining the operation of the parking brake switch 31 and the presence of any failure as shown in FIG. 6, and outputs the result of determination (e.g., a decision of apply command in S5, a decision of release command in S7) to the electric-motor drive section 78. Based on the result of determination, the electric-motor drive section 78 actuates the electric motors 7, 7 to apply or release the parking brakes.

The determination section 73 is connected to the warning section 74, the actuation informing section 75, and the switch-state informing section 76. The determination section 73 outputs a command for issuing a notice (an informing command) to the warning section 74, the actuation informing section 75, and the switch-state informing section 76, based on the processing flow shown in FIG. 7 for informing the operation of the parking brake switch 31 and any failure (wire disconnection).

The warning section 74 is connected to a warning device 81. The warning device 81 is provided, for example, in an instrument panel in front of the driver's seat and corresponds to a vehicle warning light (vehicle warning lamp) that lights to inform a failure when at least one of the vehicle devices including the parking brake switch 31 and the parking-brake control device 71 fails. In other words, the warning section 74 corresponds to an informing unit configured to inform any failure (wire disconnection) of the parking brake switch 31. Further, the warning section 74 corresponds to a failure informing unit configured to inform any failure of a vehicle device other than the parking brake switch 31.

For example, when the determination section 73 determines that a failure (wire disconnection) of the parking brake switch 31 occurs, the determination section 73 outputs an informing command (failure informing command) to the warning section 74, which in turn outputs a lighting command to the warning device 81. The warning device 81 lights up based on the lighting command from the warning section 74. In the embodiment, the determination section 73 monitors the voltage detected by the input detection section 72 at all times, so that upon detecting a voltage value indicative of a failure, the determination section 73 notifies the driver of the failure by lighting the waring device 81 via the warning section 74.

The actuation informing section 75 is connected to the actuation informing device 82. The actuation informing device 82 is provided, for example, in the instrument panel in front of the driver's seat, and corresponds to a parking brake light (parking brake lamp) that lights up when the parking brakes are on (in apply state) to indicate the fact. According to the embodiment, in the event of a failure (wire disconnection) of the parking brake switch 31, the actuation informing device 82 blinks while the parking brake switch 31 is being operated. As such, the actuation informing section 75 corresponds to an actuation-state informing unit configured to inform the actuation state of the rear-wheel disc brakes 6. In addition, the actuation informing section 75 corresponds to an informing unit in the event of detecting an operation of the parting brake switch 31 while the warning section 74 indicates a failure.

For example, when the determination section 73 determines that the parking brake switch 31 is operating (in apply state), the determination section 73 outputs an informing command (parking brake actuation informing command) to the actuation informing section 75, which in turn outputs a lighting command to the actuation informing device 82. When the determination section 73 determines that the parking brake switch 31 is not operating (in release state), the actuation informing section 75 outputs a light-off command to the actuation informing device 82. On the other hand, when the determination section 73 determines that a failure (wire disconnection) of the parking brake switch 31 occurs and that the parking brake switch 31 is operated, the determination section 73 outputs a informing command (a command for informing the operation of the parking brake switch during a failure) to the actuation informing section 75, which in turn outputs a blink command to the actuation informing device 82. The actuation informing device 82 lights, turns off, or blinks, based on a lighting command, turning-off command, or a blink command from the actuation informing section 75.

The switch-state informing section 76 is connected to the switch-state informing device 83. The switch-state informing device 83 is provided, for example, near the parking brake switch 31 or in the parking brake switch 31 itself, and corresponds to a switch operation indicating light (operation lamp) that blinks when the parking brake switch 31 is operated to indicate the fact. In the embodiment, the switch-state informing device 83 blinks as long as the parking brake switch 31 in normal state is operated. When the parking brake switch 31 in failure (wire disconnection) state is operated, the switch-state informing device 83 does not blink, but the actuation informing device 82 blinks.

For example, when the determination section 73 determines that the parking brake switch 31 is normal and that the parking brake switch 31 is operated, the determination section 73 outputs an informing command (command for informing the operation of the parking brake switch) to the switch-state informing section 76, which in turn outputs a blink command to the switch-state informing device 83. The switch-state informing device 83 blinks, based on the blink command from the switch-state informing section 76.

The determination section 73 is also connected to the signal blocking section 77. The signal blocking section 77 blocks input voltages V1, V2 that would otherwise be input to the input terminals 34, 35 of the parking brake switch 31, based on a command from the determination section 73. For example, when a voltage detected by the input detection section 72 stays high, the determination section 73 determines a ground fault, with the signal blocking section 77 blocking the input voltages V1, V2.

Now, a control process performed by the determination section 73 of the parking-brake control device 71 will be described with reference to FIGS. 6 and 7. FIG. 6 shows a process of determining the operation and any failure (wire disconnection) of the parking brake switch 31, and FIG. 7 shows a process of informing the operation and any failure (wire disconnection) of the parking brake switch 31. The control process of FIGS. 6 and 7 is repeated with a predetermined control cycle, or at predetermined intervals (e.g., 10 ms), for example, while the parking-brake control device 71 is energized.

First, the process of FIG. 6 will be described. Activating the parking-brake control device 71 starts the control process of FIG. 6. In S1, the determination section 73 obtains the voltages input to "D1" and "D2" of the input detection section 72. In the next S2, it is determined whether the parking brake switch 31 is normal and is not operated. More specifically, it is determined whether the voltage at D1 obtained in S1 is "A×V1" and the voltage at D2 is "B×V2." If "YES" in S2, that is, if it is determined that the parking brake switch 31 is normal and is not operated, the process goes to S3. In S3, it is decided that the parking brake switch 31 is normal and is not operated (decision of non-operation), and the process goes to RETURN (through RETURN, the process returns to START and repeats the process from S1 onward).

On the other hand, if "NO" in S2, that is, if it is determined that the parking brake switch 31 is not in the state in which it is normal and not operated, the process goes to S4. In S4, it is determined whether the parking brake switch 31 is normal and in apply operation. That is, it is determined whether the voltage at D1 obtained in S1 is "C×V2" and the voltage at D2 is "D×V1." If "YES" in S4, that is, if it is determined that the parking brake switch 31 is normal and in apply operation, the process goes to S5. In S5, it is decided that the parking brake switch 31 is normal and in apply operation (decision of apply operation), and the process goes to RETURN. Then, in S5, the decision of apply operation is output to the electric-motor drive section 78, which in turn drives the electric motors 7, 7 to apply the parking brakes.

On the other hand, if "NO" in S4, that is, if it is determined that the parking brake switch 31 is not in the state in which it is normal and is in apply operation, the process goes to S6. In S6, it is determined whether the parking brake switch 31 is normal and in release operation. That is, it is determined whether the voltage at D1 obtained in S1 is "A×V2" and the voltage at D2 is "B×V1." If "YES" in S6, that is, if it is determined that the parking brake switch 31 is normal and in release operation, the process goes to S7. In S7, it is decided that the parking brake switch 31 is normal and in release operation (decision of release operation), and the process goes to RETURN. Then, in S7, the decision of release operation is output to the electric-motor drive section 78, which in turn drives the electric motors 7, 7 to release the parking brakes.

On the other hand, if "NO" in S6, that is, if it is determined that the parking brake switch 31 is not in the state in which it is normal and is in release operation, the process goes to S8. In S8, it is decided that the parking brake switch 31 has been failing (wire disconnection) (decision of switch failure), and the process goes to S9. When the switch failure is decided by the processing of S8, in S21 of FIG. 7, described later, "YES" is determined. In this case, for example, a switch failure flag ON may be turned on in S8, and "YES" may be determined when the switch failure flag is ON in S21 of FIG. 7, described later.

In S9 following S8, it is determined whether the parking brake switch 31 is failing and is not operated. That is, it is determined whether the voltages at D1 and D2 obtained in S1 correspond to any of the voltage patterns of non-operation in the events of "P1 wire disconnection," "P2 wire disconnection," "P3 wire disconnection," and "P4 wire disconnection" shown in FIG. 8. If "YES" in S9, that is, if it is determined that the parking brake switch 31 is failing and is not operated, the process goes to RETURN.

On the other hand, if "NO" in S9, that is, if it is determined that the parking brake switch 31 is not in the state in which it is failing and is not operated, the process goes to S10. In S10, it is determined whether the parking brake switch 31 is failing and is in apply operation. That is, it is determined whether the voltages at D1 and D2 obtained in S1 correspond to any of the voltage patterns of apply operation in the events of "P1 wire disconnection," "P2 wire disconnection," "P3 wire disconnection," and "P4 wire disconnection" shown in FIG. 8. If "YES" in S10, that is, if it is determined that it is failing and is in apply operation, the process goes to S11.

In S11, it is decided that the parking brake switch 31 is failing and in apply operation (decision of apply operation during failure), and the process goes to RETURN. In this case, because of the failure even though the apply operation is decided, the motors 7, 7 are not activated. That is, because of the failure of the parking brake switch 31, the demand (apply demand) from the driver is not executed even if the driver operates the parking brake switch 31 to the apply side. However, during such a failure, for example, auto-applying may be performed in response to an automatic apply demand through an apply determination logic even though the parking brake switch 31 is not operated.

On the other hand, if "NO" in S10, that is, if it is determined that the parking brake switch 31 is not in the state that it is failing and in apply operation, the process goes to S12. In S12, it is determined whether the parking brake switch 31 is failing and in release operation. That is, it is determined whether the voltages at D1 and D2 obtained in S1 correspond to any of the voltage patterns of release operation in the events of "P1 wire disconnection," "P2 wire disconnection," "P3 wire disconnection," and "P4 wire disconnection" shown in FIG. 8. If "YES" in S12, that is, if the parking brake switch 31 is determined to be failing and in release operation, the process goes to S13. If "NO" in S12, that is, if it is determined that the parking brake switch 31 is not in the state in which it is failing and in release operation, the process goes to RETURN without going through S13.

In S13, it is decided that the parking brake switch 31 is failing and in release operation (decision of release operation during failure), and the process goes to RETURN. In this case, because of the failure, the electric motors 7, 7 are not activated even though the release operation is decided. That is, because of the failure of the parking brake switch 31, the demand (release demand) from the driver even if the driver operates the parking brake switch 31 to the release side. However, during such a failure, auto-release may be performed on the basis of an automatic release demand through a release determination logic, even though the parking brake switch 31 is not operated.

Now, the process of FIG. 7 will be described. Activating the parking-brake control device 71 starts the control process of FIG. 7. The determination section 73 determines in S21 whether the parking brake switch 31 is failing. This determination can be made, for example, by determining, in the event of "NO" given in S6 of FIG. 6, whether the failure of the parking brake switch 31 is at present decided in S8. If "NO" in S21, that is, if the parking brake switch 31 is determined not to be failing (not "NO" in S6 of FIG. 6), the process goes to S22.

In S22, it is determined whether the parking brake switch 31 is being operated. This determination can be made, for example, by determining, in the event of "YES" in S4 of FIG. 6, whether the apply command is at present decided in S5, or by determining, in the event of "YES" in S6 of FIG. 6, whether the release command is decided in S7.

If "NO" in S22, that is, if the parking brake switch 31 is determined not to be operated, the process goes to RETURN (through RETURN, the process returns to START and repeats the process from S21 onward). On the other hand, if "YES" in S22, that is, if the parking brake switch 31 is determined to be operated, the process goes to S23 and then to RETURN. In S23, the switch-state informing device 83 blinks. More specifically, in S23, the determination section 73 outputs an informing command (command for informing operation of the parking brake switch) to the switch-state informing section 76, which in turn outputs a blink command to the switch-state informing device 83. This sets the switch-state informing device 83 blinking.

On the other hand, if "YES" in S21, that is, if the parking brake switch 31 is determined to be failing ("NO" in S6 of FIG. 6), the process goes to S24. In S24, the warning device 81 lights. More specifically, in S24, the determination section 73 outputs an informing command (failure informing command) to the warning section 74, which in turn outputs a lighting command to the warning device 81. This lights the warning device 81.

In S25 following S24, it is determined whether the parking brake switch 31 is being operated. This determination can be made, for example, by determining, in the event of "YES" in S10 of FIG. 6, whether the apply command during failure is at present decided in S11 or by determining, in the event of "YES" in S12 of FIG. 6, whether the release command during failure is decided in S13.

If "NO" in S25, that is, if the parking brake switch 31 is determined not to be operated, the process goes to RETURN. On the other hand, if "YES" in S25, that is, if the parking brake switch 31 is determined to be operated, the process goes to S26 and then to RETURN. In S26, the actuation informing device 82 blinks. More specifically, in S26, the determination section 73 outputs an informing command (command for informing operation of the parking brake switch during failure) to the actuation informing section 75, which in turn outputs a blink command to the actuation informing device 82. This sets the actuation informing device 82 blinking. In this case, even if the parking brake switch 31 is operated, the demand is not executed (the electric motors 7, 7 do not operate). Thus, the blinking of actuation informing device 82 indicates that the operation cannot be accepted.

As described above, the embodiment, with a simple structure, make it possible to command a required operation mode and detect the operation mode and any failure.

Specifically, in the embodiment, the four resistance wires 46, 47, 48, 49 of the parking brake switch 31 include the resistance elements 50, 51, 52, 53, respectively, which differ in value from each other. The two output terminals 38, 39 output different signals (voltages), according to a given mode command. As such, the parking brake switch 31 is capable of outputting different voltage values for three respective modes: non-operation, actuation (apply command), and release (release command). This enables the parking brake switch 31, with a simple structure, to command an operation mode (non-operation, actuation, release) required for parking brake operation. As a result, it is possible to reduce the number of resistors, the number of control lines, and the number of terminals, which leads to a cost reduction and aids in electronic circuit integration, a reduction in the area occupied by parts, and a reduction in the number of input and output ports for the parking-brake control device 71.

In the embodiment, the two input terminals 34, 35 and the output terminals 38, 39 of the parking-brake control device 71 are so configured that the first input terminal 34 and the first output terminal 38 are paired up and the second input terminal 35 and the second output terminal 39 are paired up. Of the four resistance wires 46, 47, 48, 49, the R1 resistance wire 46 and the R3 resistance wire 48, which are the other wiring (first resistance wires), are connected to the output terminals 38, 39, paired up with the input terminals 34, 35, respectively. In other words, the R1 resistance wire 46 is connected to the first output terminal 38 paired up with the first input terminal 34, and the R3 resistance wire 48 is connected to the second output terminal 39 paired up with the second input terminal 35. This simplifies the wiring configuration of (the input device 33 of) the parking brake switch 31.

In the embodiment, the input terminals 34, 35 of the parking brake switch 31 are connected to a vehicle electric power source (power source line 19). This makes it possible to directly feed electric power for the parking brake switch 31 to the electric parking switch 31 (e.g., without passing through the parking-brake control device 71), thus making it possible to simplify the wiring configuration and facilitate wire routing.

In the embodiment, the input terminals 34, 35 of the parking brake switch 31 are supplied with different voltages V1, V2. This enables the parking brake switch 31 in normal state to output different voltage values for the three modes of non-operation, actuation, and release and also to output voltage values for the three modes of non-operation, actuation, and release in the event of failure due to wire disconnection that differ from those in normal state. This allows the parking brake switch 31, with a simple structure, to command a required operation mode (non-operation, actuation, release), both in normal state and in the event of a failure. The parking-brake control device 71 (input detection section 72 and determination section 73), with a simple structure, is capable, both in normal state and in the event of a failure, of detecting the operation mode of the parking brake switch 31 (non-operation, actuation, release).

In the embodiment, the parking-brake control device 71 issues a notice through different informing sections (warning section 74, actuation informing section 75), based on a result detected by the input detection section 72 and the determination section 73. More specifically, the parking-brake control device 71 issues a failure notice (lights the warning device 81) through the warning section 74 when the input detection section 72 and the determination section 73 detects a switch failure. If the input detection section 72 and the determination section 73 detect an operation of the parking brake switch 31 during this failure informing, the parking-brake control device 71 informs via the actuation informing section 75 that the operation cannot be accepted (by blinking the actuation informing device 82). This allows the parking-brake control device 71, with a simple stricture, to inform the operation mode and the switch failure. Further, the driver, seeing the warning device 81 lighting and the actuation informing device 82 blinking, can distinctly recognize (distinguish) the failure of the park brake switch 31. In this case, if the parking brake switch 31 is normal, the switch-state informing section 76 sets the switch-state informing device 83 blinking, and if the parking brake switch 31 is failing (wire disconnection), the warning section 74 lights the warning device 81, and the actuation informing section 75 sets the actuation informing device 82 blinking. This allows the driver to recognize the state of the parking brake switch 31.

In the embodiment, a switch failure is informed by the warning section 74, which also informs a failure of another vehicle device. This makes it possible to distinctly inform a switch failure via the warning section 74 (by lighting the warning device 81).

In the embodiment, during failure informing, an operation of the parking brake switch 31 detected by the input detection section 72 and the determination section 73 is informed by the actuation informing section 75, which informs the actuation state of the rear-wheel disc brakes 6. This makes it possible to distinctly inform the operation of the switch while failing via the actuation informing section 75 (by setting the actuation informing device 82 blinking).

Figure 9:
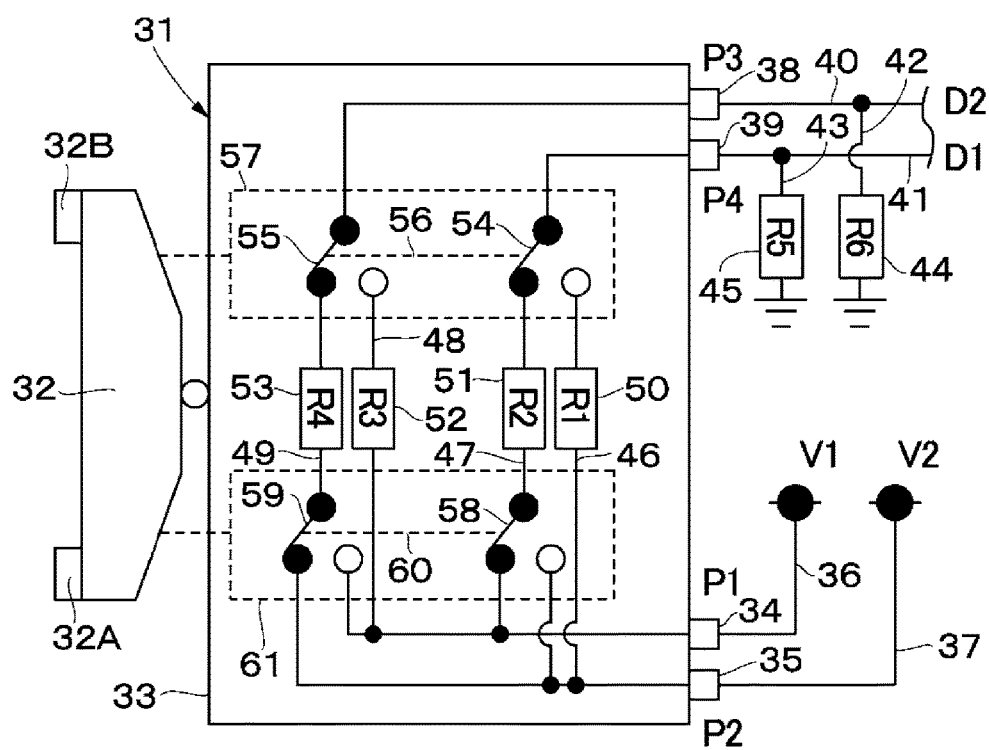
FIG. 9 is a circuit diagram of a parking brake switch in non-operation mode according to a second embodiment.

FIG. 9 shows a second embodiment. The second embodiment is characterized by interchanging the input terminals and output terminals of the first embodiment (the input terminals of the first embodiment are now output terminals and the output terminals of the first embodiment are now input terminals). In this second embodiment, the constituent elements that are the same as those of the first embodiment are denoted by the same reference numeral, and description thereof is omitted.

In the second embodiment, the first switch elements 54, 55 are provided for the two output terminals 38, 39, respectively, and switches connections to two wirings (one wiring and the other wiring), according to an actuation command from the operating section 32. In other words, the first switch elements 54, 55 simultaneously switch, to the two output terminals 38, 39, the R2 resistance wire 47 and the R4 resistance wire 49, which are the two first resistance wires (one wiring), and the R1 resistance wire 46 and the R3 resistance wire 43, which are the other two second resistance wires (the other wiring), according to a given mode command. In this case, operating the release command side operating section 32B of the operating section 32 switches the first switch section 57, simultaneously switching the two first switch elements 54, 55.

The second switch elements 58, 59 are connected to one wiring, of the two wirings (one wiring and the other wiring), that is put into connection when an actuation command given to the first switch elements 54, 55 is the non-operation, namely, the R2 resistance wire 47 and the R4 resistance wire 49, which are the first resistance wires. The second switch elements 58, 59 switch the connections between the R2 resistance wire 47 and the R4 resistance wire 49 and the two input terminals 34, 35, according to a given actuation command. In other words, the second switch elements 58, 59 simultaneously switch, to each of the two first resistance wires, namely, the R2 resistance wire 47 and the R4 resistance wire 49, the two input terminals 34, 35, according to a given mode command. In this case, operating the actuation command side operating section 32A of the operating section 32 switches the second switch section 61, simultaneously switching the two second switch elements 58, 59.

Then the second resistance wires (the other wiring), namely, the R1 resistance wire 46 and the R3 resistance wire 48, are respectively connected to the input terminals 34, 35 paired up with the output terminals 38, 39. In other words, the R1 resistance wire 46 is connected to the second input terminal 35 paired up with the second output terminal 39, and the R3 resistance wire 48 is connected to the first input terminal 34 paired up with the first output terminal 38.

The second embodiment uses the above-described parking brake switch 31 to command an operation mode (non-operation, actuation, release), and its basic operation does not differ substantially from that of the first embodiment. As with the first embodiment, the second embodiment, with a simple structure, is capable of commanding a required operation mode and thus detecting the operation mode and any failure.

Figure 10:
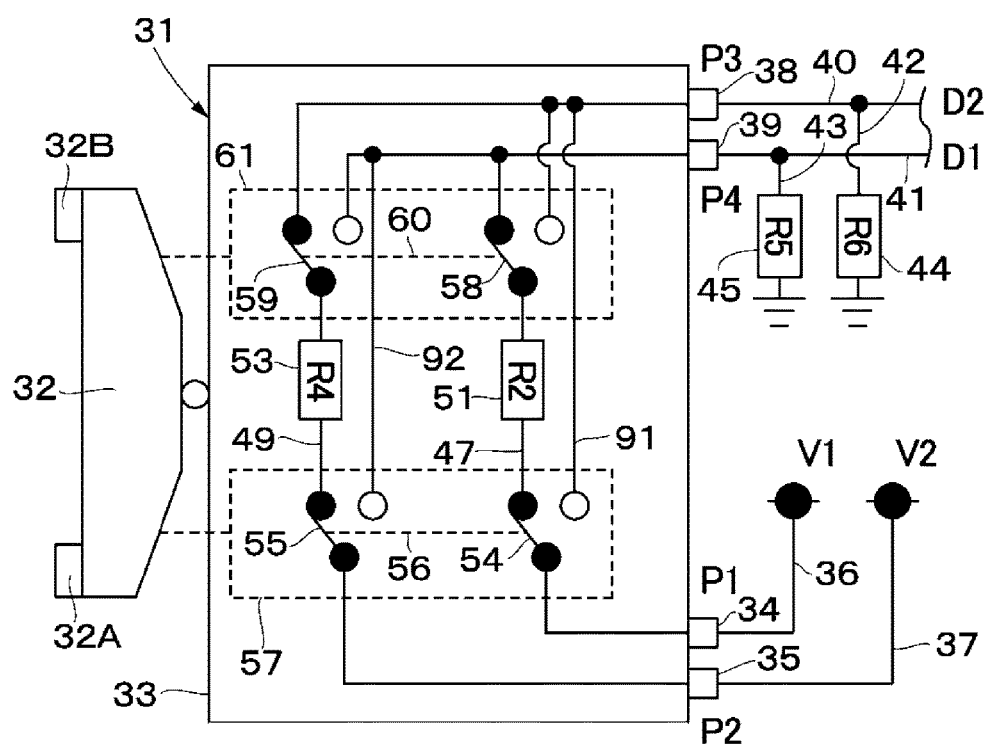
FIG. 10 is a circuit diagram of a parking brake switch in non-operation mode according to a third embodiment.

FIG. 10 shows a third embodiment. The third embodiment is characterized by the absence of the first resistance element and the third resistance element of the first embodiment (the first resistance element and the third resistance element are not provided). In the third embodiment, the same elements as those of the first embodiment are denoted by the same reference numeral, and description thereof will be omitted.

The third embodiment includes only the second resistance element 51 and the fourth resistance element 53, of the four resistance elements 50, 51, 52, 53 of the first embodiment, and does not include the first resistance element 50 and the third resistance element 52. That is, the third embodiment includes the second resistance element 51 for the R2 resistance wire 47 and the fourth resistance element 53 for the R4 resistance wire 49, which are connected between the input terminals 34, 35 and the output terminals 38, 39 when the driver is not operating the operating section 32 of the parking brake switch 31 (at the time of non-operation). On the other hand, wires 91, 92, connected between the input terminals 34, 35 and the output terminals 38, 39 when the driver has put the parking brake switch 31 into the mode of brake actuation, are not provided with resistance elements. Alternatively, the wires 91, 92 may each be provided with a resistance element of the same resistance value.

The third embodiment uses the above-described parking brake switch to command an operation mode (non-operation, actuation, release), and its basic operation does not differ substantially from that of the first embodiment. As with the first embodiment, the third embodiment, with a simple structure, is capable of commanding a required operation mode and thus detecting the operation mode and any failure.

Figure 11:
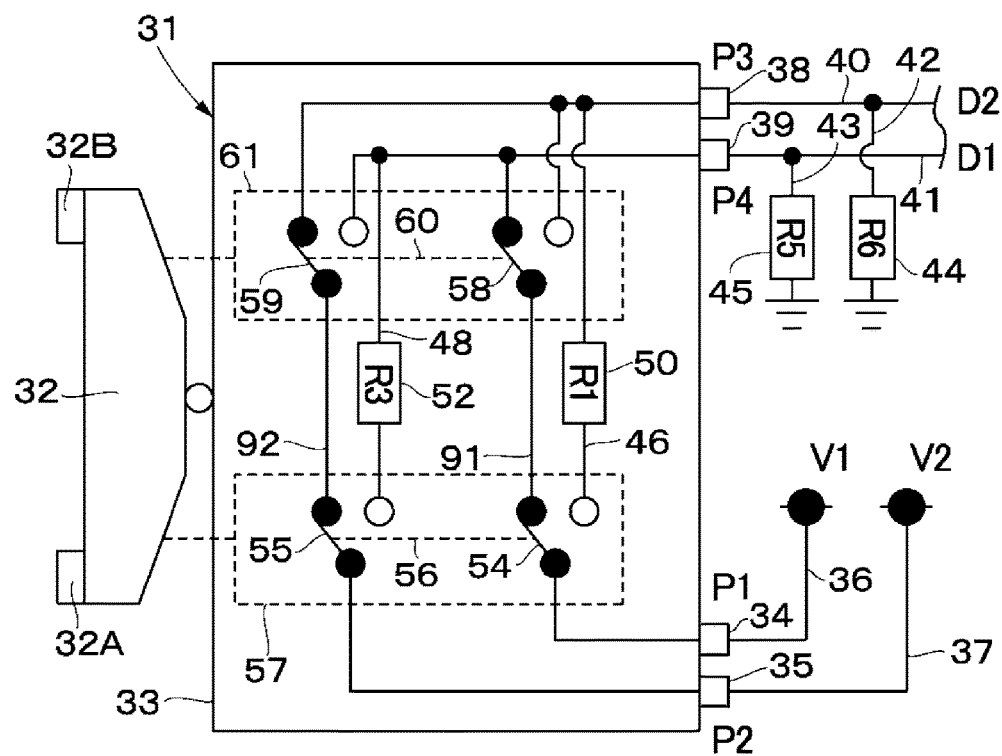
FIG. 11 is a circuit diagram of a parking brake switch in non-operation mode according to a first modification.

As a modification (a first modification) of the third embodiment shown in FIG. 11, in contrast to the third embodiment, only the first resistance element 50 and the third resistance element 52, of the four resistance elements 50, 51, 52, 53 of the first embodiment, may be used, omitting the second resistance element 51 and the fourth resistance element 53. That is, the wires 91, 92, connected between the input terminals 34, 35 and the output terminals 38, 39 at the time of non-operation, may be provided with no resistance elements. Alternatively, the wires 91, 92 may each be provided with a resistance element of the same resistance value.

Figure 12:
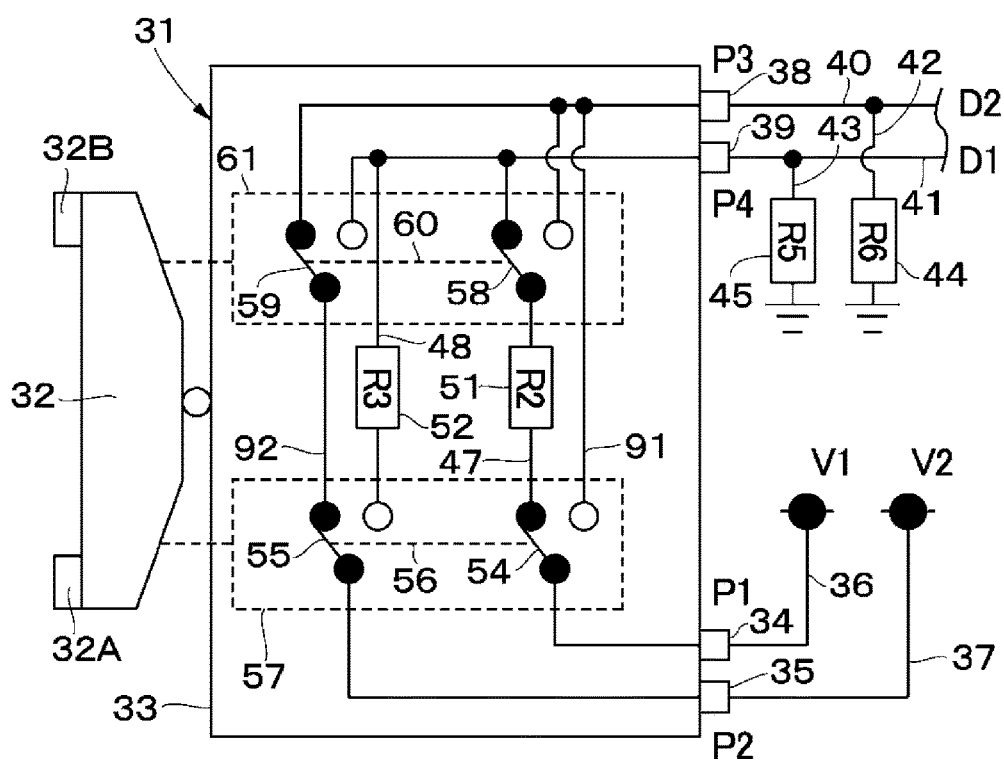
FIG. 12 is a circuit diagram of a parking brake switch in non-operation mode according to a fourth embodiment.

FIG. 12 shows a fourth embodiment. The fourth embodiment is characterized by the absence of the first resistance element and the fourth resistance element of the first embodiment (not provided with the first resistance element and the fourth resistance element). In the fourth embodiment, the same elements as those of the first and third embodiments are denoted by the same reference numeral, and description thereof will be omitted.

The fourth embodiment includes only the second resistance element 51 and the third resistance element 52, of the four resistance elements 50, 51, 52, 53 of the first embodiment, and does not include the first resistance element 50 and the fourth resistance element 53. That is, in the fourth embodiment, there is at least one resistance element (the first resistance element 50 and the fourth resistance element 53) each between the first input terminal 34 and the first output terminal 38 which form one pair, and between the second input terminal 35 and the second output terminal 39 which form another pair. The wires 91, 92, which are not provided with a resistance element, may each be provided with a resistance element of the same resistance value.

The fourth element uses the above-described parking brake switch 31 to command an operation mode (non-operation, actuation, release), and its basic operation does not differ substantially from that of the first embodiment. As with the first embodiment, the fourth embodiment, with a simple structure, is capable of commanding a required operation mode and thus detecting the operation mode and any failure.

Figure 13:
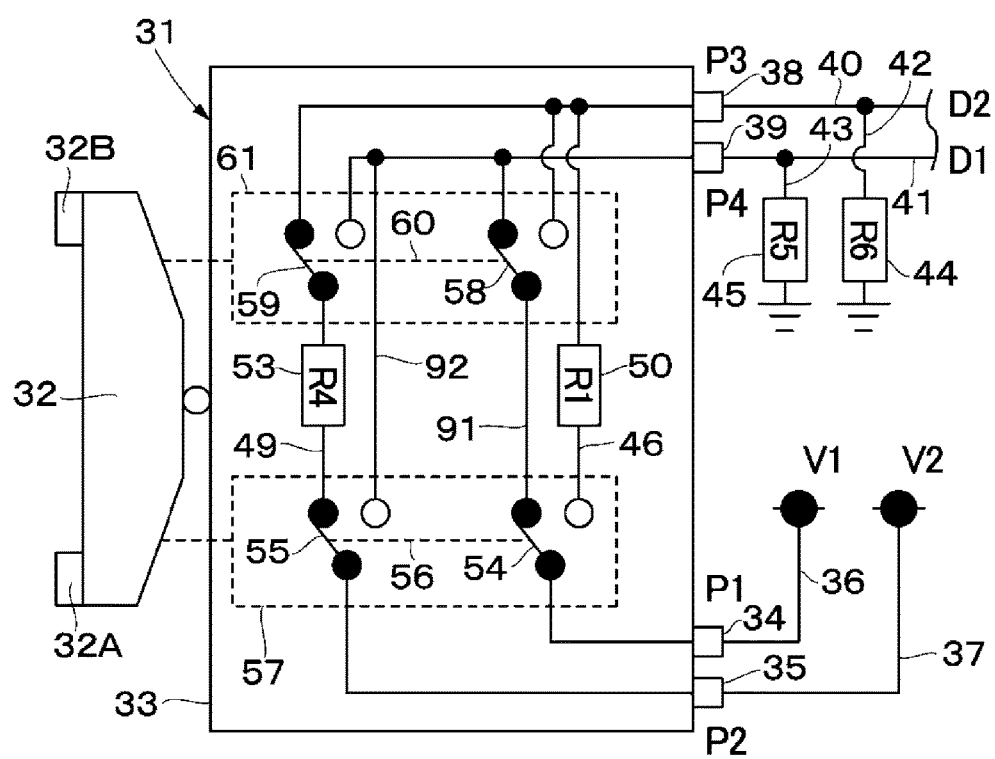
FIG. 13 is a circuit diagram of a parking brake switch in non-operation mode according to a second modification.

As a modification (a second modification) of the fourth embodiment shown in FIG. 13, in contrast to the fourth embodiment, only the first resistance element 50 and the fourth resistance element 53, of the four resistance elements 50, 51, 52, 53 of the first embodiment, may be used, omitting the second resistance element 51 and the third resistance element 52. The wires 91, 92, which are not provided with a resistance element, may each be provided with a resistance element of the same resistance value. To sum up all of the first embodiment, the third embodiment, the first modification, the fourth embodiment, and the second modification, of the pair of the two wirings (the first resistance wires forming one wiring, and the second resistance wires forming the outer wiring), at least either the one wiring or the other wiring is provided with resistances (resistance elements) that differ in value from each other.

The above embodiments are described by way of example in term of the parking-brake control device 71 directly connected to the warning device 81, actuation informing device 82, and the switch-state informing device 83. However, the embodiments are not limited to this example; instead, for example, the parking-brake control device may be connected indirectly to the warning device, the actuation informing device, and the switch-state informing device via a vehicle data bus, a signal line, wiring, a controller, or the like.

The above embodiments are described by way of example in terms of the warning device 81 serving as a vehicle warning light (a main warning light), the actuation informing device 82 serving as a parking brake indicating light, and the switch-state informing device 83 serving as a switch operation indicating light, as informing devices (informing unit) notifying the driver of the operation mode of the parking brake switch 31 and any switch failure. However, the above embodiments are not limited to this example; instead, various other types of informing device (warning light), for example, one that indicates a switch failure with a dedicated warning light for switch failure (a switch-failure warning light), may be used according to the vehicle specifications and so on. Such informing devices are not limited to lights (lamps) that issue a notice by lighting or blinking, and may instead be various other types of informing device that issue a notice on a monitor or by means of sound using an acoustic device.

The above embodiments are described by way of example in terms of the parking-brake control device 71 that performs parallel processing of the process flow of FIG. 6 for determining the operation of the parking brake switch 31 and any failure (wire disconnection) and the process flow of FIG. 7 for informing the operation of the parking brake switch 31 and any failure (wire disconnection). However, the embodiments are not limited to those and the parking-brake control device 71 may instead be configured, for example, to perform the process flow of FIG. 6 and then the process flow of FIG. 7, i.e, series processing of the process flow of FIG. 6 and the process flow of FIG. 7. Further, a flag is set to ON in accordance with a result of determination.

The above embodiments are described by way of example in terms of the disc brakes 6 having an electric parking brake function for left and right rear-wheel brakes. However, the embodiments are not limited to those; instead, such disc brakes having an electric parking brake function may be used for left and right front-wheel brakes. Alternatively, the brakes for all of the front and rear wheels (all of the four wheels) may be disc brakes having an electric parking brake function. In short, the brakes for at least one pair of wheels of a vehicle may be disc brakes having an electric parking brake function.

The above embodiments are described by way of example as in terms of the hydraulic disc brakes 6 having an electric parking brake. However, the embodiments are not limited to those; instead, electric disc brakes that do not require supply of fluid pressure may be used. The embodiments are not limited to the brake mechanism of disc brake type; instead, a brake mechanism of drum brake type may be used. Further, any other type of brake mechanism may be used, such as drum-in-disc brakes, in which disc brakes are provided with electric parking brakes of drum type, or a structure that holds parking brakes by pulling a cable with use of an electric motor. In this case, for example, in the case of an electric brake mechanism that does not require supply of hydraulic pressure, the control unit may be configured to apply brake force as service brakes to the vehicle (drive an electric motor, based on an apply demand, for example by operation of the brake pedal).

The above embodiments, with a simple structure, are capable of commanding a required operation mode and thus detecting the operation mode and any failure.

These embodiments are provided with resistances differing in value from each other on at least one or the other wiring of the pair of two wirings of the operating switch, the resistances. More specifically, the four resistance wires of the operating switch have respective resistance elements of differing value, and two output terminals output respective different signals, according to a given mode command. As such, the operating switch can output different voltage values for the three modes of non-operation, actuation, and release. In this way, the operating switch, with a simple structure, can command an operation mode (non-operation, actuation, release) required for the operation of the parking brakes. As a result, it is possible to reduce the number of resistors, the number of control lines, and the number of terminals, which leads to a cost reduction and aids in electronic circuit integration, a reduction in the area occupied by parts, and a reduction in the number of input and output ports for the control controller.

According to the embodiments, the two input terminals and output terminals of the operating switch are such that the input terminals are paired up with the respective output terminals, and the other wiring of the two wirings is connected to the output terminals or the input terminals, which is paired up with the respective input terminals or output terminals. This simplifies the wiring configuration of the operating switch.

According to the embodiments, the vehicle electric power source is connected to the input terminals of the operating switch. This makes it possible to directly feed electric power for the operating switch to the operating switch (e.g., without passing through the parking-brake control device), thus making it possible to simplify the wiring configuration and facilitate wire routing.

According to the embodiments, the input terminals of the parking brake switch are supplied with different voltages. This enables the operating switch in normal state to output different voltage values for the three modes of non-operation, actuation, and release, and also to output voltage values for the three modes of non-operation, actuation, and release in the event of failure due to wire disconnection which values differ from those in normal state. This makes it possible for the operating switch, with a simple structure, to command a required operation mode (non-operation, actuation, release), both in normal state and in the event of a failure.

According to the embodiments, a notice is issued through a different informing unit, based on a result detected by a detection unit. More specifically, a failure notice is issued when the detection unit detects a switch failure. If the detection unit detects an operation of the operating switch during this failure informing, an informing unit other than the failure informing unit indicates that the operation cannot be accepted. This makes it possible, with a simple stricture, to inform the operation mode and the switch failure. Further, the driver can distinctly recognize (distinguish) the operation mode of the operating switch and the presence or absence of any failure.

According to the embodiments, the input terminals are supplied with respective voltages that differ from each other. This allows the operating switch in normal state to output different voltage values for the three modes of non-operation, actuation, and release and also, in the event of a failure due to wire disconnection, to output voltage values for the three modes of non-operation, actuation, release which values are different from those in normal state. This, in turn, permits the detection unit, with a simple structure, to detect the operation modes (non-operation, actuation, release) of the operating switch, both in normal state and in the event of a failure.

According to the embodiments, the informing unit configured to inform any switch failure is a failure informing unit configured to inform any failure of another vehicle device. This makes it possible to distinctly inform a switch failure via the failure informing unit.

According to the embodiments, the informing unit when an operation of the operating switch is detected by the detection unit during failure informing is an actuation-state informing unit configured to inform the actuation state of the parking brake mechanism. This makes it possible to distinctly inform the operation of the switch during its failure via the actuation-state informing unit.

The embodiments of the present invention described above are intended to facilitate understanding of the present invention and not to limit the present invention. Various modifications and improvements are possible without departing the spirit of the present invention, and the scope of the present invention encompasses its equivalents. Further, within a range in which the above-mentioned problems can be at least partially solved or within a range in which the above-mentioned effects are at least partially obtained, a suitable combination or omission of the components recited in the claims and described in the specification is possible.

The present application claims priority to Japanese Patent Application No. 2015-171300, filed on Aug. 31, 2015. The entire disclosure in Japanese Patent Application No. 2015-171300, filed on Aug. 31, 2015, including the specification, the claims, the drawings, and the abstract, are incorporated herein by reference.

REFERENCE NUMERALS 1. vehicle body
2. front wheel (wheel)
3. rear wheel (wheel)
4. disc rotor (rotating member)
6. rear-wheel disc brake (electric parking brake mechanism)
7. electric motor
31. parking brake switch (operating switch)
34. first input terminal (input terminal)
35. second input terminal (input terminal)
38. first output terminal (output terminal)
39. second output terminal (output terminal)
46. R1 resistance wire (other wiring, second resistance wire)
47. R2 resistance wire (one wiring, first resistance wire)
48. R3 resistance wire (other wiring, second resistance wire)
49. R4 resistance wire (one wiring, first resistance wire)
50. first resistance element (resistance element)
51. second resistance element (resistance element)
52. third resistance element (resistance element)
53. fourth resistance element (resistance element)
71. parking brake control device
72. input detection section (detection unit)
73. determination section (detection unit)
74. warning section (informing unit, failure informing unit)
75. actuation informing section (informing unit, actuation-state informing unit)
91. wire
92. wire

The invention claimed is:

1. An operating switch for commanding an actuation of an electric parking brake mechanism, comprising:
   two input terminals and two output terminals;
   a pair of two wirings for each input-terminal/output-terminal pair of the two input terminals and the two output terminals, each of the wirings being located between the input terminals and two output terminals;
   a first switch element provided for the input terminals or the output terminals, and configured to switch connections to the two wirings, according to a command for the actuation; and
   a second switch element connected to one wiring of the two wirings that connects the input terminals and the output terminals when the command for the actuation given to the first switch element is set to a mode of non-operation, the second switch element being configured to switch connections to the two output terminals or the two input terminals, according to the command for the actuation, wherein of the pair of two wirings, at least either the one wiring or the other wiring other than the one wiring is provided with resistances that differ in value from each other.

2. The operating switch according to claim 1, wherein:

the two input terminals and the two output terminals are such that one of the input terminals and one of the output terminals form an electrically associated pair; and of the two wirings, the other wiring is connected to the one of the output terminals or the one of the input terminals, which is paired up with the one of the input terminals or the one of the output terminals.

3. An operating switch for commanding a mode of non-operation, a mode of brake actuation, and a mode of brake release, as actuations of an electric parking brake mechanism, the operating switch comprising:

two input terminals;

two output terminals;

four resistance wires provided between the two input terminals and the two output terminals and respectively including resistance elements that differ in value from each other;

a first switch element configured to simultaneously switch connections between the two input terminals, and two first resistance wires and the other two second resistance wires, of the four resistance wires, which first and second resistance wires are connected to the respective output terminals, and on the other, according to a mode command indicative of any of the mode of non-operation, the mode of brake actuation, and the mode of brake release; and a second switch element configured to simultaneously switch connections between the two first resistance wires and the two respective output terminals, according to the mode command, wherein the two output terminals are configured to output respective signals that differ from each other, according to the mode command.

4. The operating switch according to claim 1, wherein a vehicle electric power source is connected to the two input terminals.

5. The operating switch according to claim 1, wherein the two input terminals are supplied with respective voltages that differ from each other.

6. The operating switch according to claim 2, wherein a vehicle electric power source is connected to the two input terminals.

7. The operating switch according to claim 2, wherein the two input terminals are supplied with respective voltages that differ from each other.

8. The operating switch according to claim 3, wherein a vehicle electric power source is connected to the two input terminals.

9. The operating switch according to claim 3, wherein the two input terminals are supplied with respective voltages that differ from each other.

10. A parking brake control device for applying voltage to an operating switch for commanding an actuation of an electric parking brake mechanism to detect operation modes of non-operation, actuation command, and release command, wherein:

the operating switch comprises two output terminals configured to output respective signals that differ from each other, according to the operation modes, using resistance elements disposed in the operating switch, the parking brake control device comprising:

a detection unit configured to detect the operation modes and any switch failure, from output values from the two output terminals when voltage is applied to contacts of the operating switch, wherein notices are respectively issued by different informing units, based on a result detected by the detection unit.

11. The parking brake control device according to claim 10, wherein a vehicle electric power source is connected to the two output terminals.

12. The parking brake control device according to claim 10, wherein the two output terminals are supplied with respective voltages that differ from each other.

13. The parking brake control device according to claim 10, wherein the informing unit configured to inform the switch failure is a failure informing unit configured to inform any failure of another vehicle device.

14. The parking brake control device according to claim 10, wherein the informing unit when the operation of the operating switch is detected by the detection unit while the failure notice is being issued is an actuation-state informing unit configured to inform an actuation state of the parking brake mechanism.

15. A parking brake control device for applying voltage to an operating switch for commanding an actuation of an electric parking brake mechanism to detect operation modes of non-operation, actuation command, and release command, wherein:

the operating switch comprises two output terminals configured to output respective signals that differ from each other, according to the operation modes, using resistance elements disposed in the operating switch, the parking brake control device comprising:

a detection unit configured to detect the operation modes and any switch failure, from output values from the two output terminals when voltage is applied to contacts of the operating switch, wherein a failure notice is issued upon detection of switch failure by the detection unit, and if an operation of the operating switch is detected by the detection unit while the failure notice is being issued, an informing unit other than failure informing unit informs that the operation cannot be accepted.

16. The operating switch according to claim 15, wherein a vehicle electric power source is connected to the two input terminals.

17. The operating switch according to claim 15, wherein the two input terminals are supplied with respective voltages that differ from each other.

18. The parking brake control device according to claim 15, wherein the informing unit configured to inform the switch failure is a failure informing unit configured to inform any failure of another vehicle device.

19. The parking brake control device according to claim 15, wherein the informing unit when the operation of the operating switch is detected by the detection unit while the failure notice is being issued is an actuation-state informing unit configured to inform an actuation state of the parking brake mechanism.

* * * * *